US008972033B2

(12) United States Patent
Srinivasan

(10) Patent No.: US 8,972,033 B2
(45) **Date of Patent: *Mar. 3, 2015**

(54) METHODS AND APPARATUS FOR EMBEDDING CODES IN COMPRESSED AUDIO DATA STREAMS

(75) Inventor: Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 612 days.

This patent is subject to a terminal disclaimer.

(21) Appl. No.: 13/250,354

(22) Filed: Sep. 30, 2011

(65) Prior Publication Data

US 2012/0022879 A1 Jan. 26, 2012

Related U.S. Application Data

(63) Continuation of application No. 11/870,275, filed on Oct. 10, 2007.

(60) Provisional application No. 60/850,745, filed on Oct. 11, 2006.

(51) Int. Cl.
*G06F 17/00* (2006.01)
*G10L 19/018* (2013.01)
(Continued)

(52) U.S. Cl.
CPC ........... *G10L 19/018* (2013.01); *G10L 19/0212* (2013.01); *G10L 19/035* (2013.01)
USPC ........................................................... 700/94

(58) Field of Classification Search
USPC ...................... 700/94; 380/269, 236, 54, 246; 704/E19.09, E19.01; 713/168-181; 382/100, 232, 280, 281
See application file for complete search history.

(56) References Cited

U.S. PATENT DOCUMENTS 4,675,750 A 6/1987 Collins et al.
5,161,210 A 11/1992 Druyvesteyn et al.
(Continued)

FOREIGN PATENT DOCUMENTS

AU 2005270105 2/2006
CA 2529310 1/2005
(Continued)

OTHER PUBLICATIONS

Abdulaziz et al., "Wavelet Transform and Channel Coding for Data Hiding in Video," Department of Electrical and Computer Systems Engineering, Monash University, Clayton, Australia, 2001 (5 pages).
(Continued)

*Primary Examiner* — Andrew C Flanders
(74) *Attorney, Agent, or Firm* — Hanley, Flight & Zimmerman, LLC

(57) ABSTRACT

Methods and apparatus for embedding codes in compressed audio data streams are disclosed. An example apparatus disclosed herein to embed a code in a compressed audio data stream comprises an unpacking unit to determine a plurality of transform coefficients associated with the compressed audio data stream, the plurality of transform coefficients being represented by a respective plurality of mantissas and a respective plurality of scale factors, and an embedding unit to modify a mantissa in the plurality of mantissas and a corresponding scale factor in the plurality of scale factors to embed the code in the compressed audio data stream.

20 Claims, 8 Drawing Sheets

(51) Int. Cl.

*G10L 19/02* (2013.01)
*G10L 19/035* (2013.01)

(56) References Cited

U.S. PATENT DOCUMENTS 5,319,453 A 6/1994 Copriviza et al.
5,349,549 A 9/1994 Tsutsui
5,450,490 A 9/1995 Jensen et al.
5,455,630 A 10/1995 McFarland et al.
5,479,299 A 12/1995 Matsumi et al.
5,490,170 A 2/1996 Akagiri et al.
5,493,339 A 2/1996 Birch et al.
5,532,732 A 7/1996 Yuen et al.
5,539,471 A 7/1996 Myhrvold et al.
5,574,952 A 11/1996 Brady et al.
5,583,562 A 12/1996 Birch et al.
5,588,022 A 12/1996 Dapper et al.
5,598,228 A 1/1997 Saitoh
5,600,366 A 2/1997 Schulman
5,621,471 A 4/1997 Kim et al.
5,625,418 A 4/1997 Binder et al.
5,649,054 A 7/1997 Oomen et al.
5,675,610 A 10/1997 Chinen
5,677,980 A 10/1997 Naoe
5,682,463 A 10/1997 Allen et al.
5,687,191 A 11/1997 Lee et al.
5,708,476 A 1/1998 Myhrvold et al.
5,724,091 A 3/1998 Freeman et al.
5,727,092 A 3/1998 Sandford, II et al.
5,734,429 A 3/1998 Jung
5,739,864 A 4/1998 Copeland
5,739,866 A 4/1998 Kim et al.
5,745,184 A 4/1998 Neal
5,748,783 A 5/1998 Rhoads
5,764,763 A 6/1998 Jensen et al.
5,768,426 A 6/1998 Rhoads
5,778,096 A 7/1998 Stearns
5,778,102 A 7/1998 Sandford, II et al.
5,801,782 A 9/1998 Patterson
5,808,689 A 9/1998 Small
5,848,155 A 12/1998 Cox
5,852,800 A 12/1998 Modeste et al.
5,867,819 A 2/1999 Fukuchi et al.
5,870,754 A 2/1999 Dimitrova et al.
5,905,800 A 5/1999 Moskowitz et al.
5,915,027 A 6/1999 Cox et al.
5,917,830 A 6/1999 Chen et al.
5,930,369 A 7/1999 Cox et al.
6,029,045 A 2/2000 Picco et al.
6,061,793 A 5/2000 Tewfik et al.
6,064,748 A 5/2000 Hogan
6,069,914 A 5/2000 Cox
6,128,736 A 10/2000 Miller
6,154,571 A 11/2000 Cox et al.
6,181,334 B1 1/2001 Freeman et al.
6,208,691 B1 3/2001 Balakrishnan et al.
6,208,735 B1 3/2001 Cox et al.
6,209,094 B1 3/2001 Levine et al.
6,215,526 B1 4/2001 Barton et al.
6,219,634 B1 4/2001 Levine
6,240,380 B1 5/2001 Malvar
6,243,481 B1 6/2001 Tao
6,252,586 B1 6/2001 Freeman et al.
6,259,801 B1 7/2001 Wakasu
6,266,419 B1 7/2001 Lacy et al.
6,268,866 B1 7/2001 Shibata
6,272,176 B1 8/2001 Srinivasan
6,278,792 B1 8/2001 Cox et al.
6,298,142 B1 10/2001 Nakano et al.
6,320,965 B1 11/2001 Levine
6,330,672 B1 12/2001 Shur
6,339,449 B1 1/2002 Ikeda et al.
6,343,181 B1 1/2002 Ikeda et al.
6,345,100 B1 2/2002 Levine
6,345,122 B1 2/2002 Yamato et al.
6,370,199 B1 4/2002 Bock et al.
6,373,960 B1 4/2002 Conover et al.
6,381,341 B1 4/2002 Rhoads
6,389,055 B1 5/2002 August et al.
6,415,041 B1 7/2002 Oami et al.
6,421,445 B1 7/2002 Jensen et al.
6,421,450 B2 7/2002 Nakano
6,424,726 B2 7/2002 Nakano et al.
6,425,082 B1 7/2002 Matsui et al.
6,434,253 B1 8/2002 Hayashi et al.
6,442,283 B1 8/2002 Tewfik et al.
6,442,284 B1 8/2002 Gustafson et al.
6,442,285 B2 8/2002 Rhoads et al.
6,453,053 B1 9/2002 Wakasu
6,456,724 B1 9/2002 Watanabe
6,470,090 B2 10/2002 Oami et al.
6,493,457 B1 12/2002 Quackenbush et al.
6,504,870 B2 1/2003 Srinivasan
6,505,223 B1 1/2003 Haitsma et al.
6,507,299 B1 1/2003 Nuijten
6,510,233 B1 1/2003 Nakano
6,512,796 B1 1/2003 Sherwood
6,553,070 B2 4/2003 Hashimoto
6,574,350 B1 6/2003 Rhoads et al.
6,584,138 B1 6/2003 Neubauer et al.
6,587,821 B1 7/2003 Rhoads
6,611,607 B1 8/2003 Davis et al.
6,621,881 B2 9/2003 Srinivasan
6,631,198 B1 10/2003 Hannigan et al.
6,665,419 B1 12/2003 Oami
6,668,068 B2 12/2003 Hashimoto
6,683,996 B1 1/2004 Walmsley
6,687,663 B1 2/2004 McGrath et al.
6,697,499 B2 2/2004 Oami
6,700,993 B1 3/2004 Minematsu
6,721,439 B1 4/2004 Levy et al.
6,724,911 B1 4/2004 Cox et al.
6,735,325 B2 5/2004 Wakasu
6,738,493 B1 5/2004 Cox et al.
6,738,744 B2 5/2004 Kirovski et al.
6,751,337 B2 6/2004 Tewfik et al.
6,768,980 B1 7/2004 Meyer et al.
6,775,416 B1 8/2004 Hashimoto
6,785,399 B2 8/2004 Fujihara
6,798,893 B1 9/2004 Tanaka
6,807,528 B1 10/2004 Truman et al.
6,826,289 B1 11/2004 Hashimoto
6,834,345 B2 12/2004 Bloom et al.
6,839,674 B1 1/2005 Absar et al.
6,845,360 B2 1/2005 Jensen et al.
6,850,619 B1 2/2005 Hirai
6,853,737 B2 2/2005 Watanabe
6,856,693 B2 2/2005 Miller
6,891,854 B2 5/2005 Zhang et al.
6,901,606 B2 5/2005 Wright et al.
6,915,000 B1 7/2005 Tanaka
6,928,165 B1 8/2005 Takai
6,943,457 B2 9/2005 Smith
6,947,562 B2 9/2005 Hashimoto
6,947,572 B2 9/2005 Terasaki
6,985,590 B2 1/2006 Tachibana et al.
6,996,249 B2 2/2006 Miller et al.
7,006,631 B1 2/2006 Luttrell et al.
7,006,660 B2 2/2006 Hayashi
7,007,167 B2 2/2006 Kurahashi
7,027,611 B2 4/2006 Hashimoto
7,047,187 B2 5/2006 Cheng et al.
7,050,604 B2 5/2006 Fujihara et al.
7,051,207 B2 5/2006 Watanabe
7,051,351 B2 5/2006 Goldman et al.
7,088,844 B2 8/2006 Hannigan et al.
7,092,546 B2 8/2006 Tanaka
7,110,566 B2 9/2006 Pelly et al.
7,114,071 B1 9/2006 Chmounk et al.
7,114,073 B2 9/2006 Watanabe
7,140,037 B2 11/2006 Tsutsui et al.
7,146,394 B2 12/2006 Haitsma et al.
7,146,501 B2 12/2006 Tanaka
7,149,324 B2 12/2006 Tanaka

(56) References Cited

U.S. PATENT DOCUMENTS

| | | | |
|---|---|---|---|
| 7,159,117 B2 | 1/2007 | Tanaka | |
| 7,181,022 B2 | 2/2007 | Rhoads | |
| 7,197,156 B1 | 3/2007 | Levy | |
| 7,206,649 B2 | 4/2007 | Kirovski et al. | |
| 7,266,697 B2 | 9/2007 | Kirovski et al. | |
| 7,269,734 B1 | 9/2007 | Johnson et al. | |
| 7,460,684 B2 | 12/2008 | Srinivasan | |
| 7,643,652 B2 | 1/2010 | Srinivasan | |
| 7,949,147 B2 | 5/2011 | Rhoads et al. | |
| 8,085,975 B2 | 12/2011 | Srinivasan | |
| 8,351,645 B2 | 1/2013 | Srinivasan | |
| 2001/0027393 A1 | 10/2001 | Touimi et al. | |
| 2001/0028715 A1 | 10/2001 | Watanabe | |
| 2001/0031064 A1 | 10/2001 | Donescu et al. | |
| 2001/0053190 A1 | 12/2001 | Srinivasan | |
| 2002/0006203 A1 | 1/2002 | Tachibana et al. | |
| 2002/0034224 A1 | 3/2002 | Srinivasan | |
| 2002/0044225 A1 | 4/2002 | Rakib | |
| 2002/0085736 A1 | 7/2002 | Kalker et al. | |
| 2002/0085737 A1 | 7/2002 | Kitamura | |
| 2002/0087864 A1 | 7/2002 | Depovere et al. | |
| 2002/0106106 A1 | 8/2002 | Sato | |
| 2002/0129253 A1 | 9/2002 | Langelaar | |
| 2002/0147990 A1 | 10/2002 | Lu et al. | |
| 2003/0004589 A1 | 1/2003 | Bruekers et al. | |
| 2003/0016756 A1 | 1/2003 | Steenhof et al. | |
| 2003/0086587 A1 | 5/2003 | Haitsma et al. | |
| 2003/0088400 A1 | 5/2003 | Nishio et al. | |
| 2003/0123660 A1 | 7/2003 | Fletcher et al. | |
| 2003/0128861 A1 | 7/2003 | Rhoads | |
| 2003/0161469 A1 | 8/2003 | Cheng et al. | |
| 2003/0169810 A1 | 9/2003 | Costa | |
| 2004/0024588 A1 | 2/2004 | Watson et al. | |
| 2004/0054525 A1 | 3/2004 | Sekiguchi | |
| 2004/0059918 A1 | 3/2004 | Xu | |
| 2004/0179746 A1 | 9/2004 | Hashimoto | |
| 2004/0258243 A1 | 12/2004 | Shin et al. | |
| 2004/0267532 A1 | 12/2004 | Black | |
| 2004/0267533 A1 | 12/2004 | Hannigan et al. | |
| 2005/0010944 A1 | 1/2005 | Wright et al. | |
| 2005/0062843 A1 | 3/2005 | Bowers et al. | |
| 2005/0144006 A1 | 6/2005 | Oh | |
| 2006/0020809 A1 | 1/2006 | Hayashi | |
| 2006/0123443 A1 | 6/2006 | Hamilton et al. | |
| 2006/0171474 A1 | 8/2006 | Ramaswamy et al. | |
| 2006/0187358 A1 | 8/2006 | Lienhart et al. | |
| 2006/0239500 A1 | 10/2006 | Meyer et al. | |
| 2007/0036357 A1 | 2/2007 | Van der Veen et al. | |
| 2007/0300066 A1 | 12/2007 | Srinivasan | |
| 2008/0091288 A1 | 4/2008 | Srinivasan | |
| 2008/0253440 A1 | 10/2008 | Srinivasan et al. | |
| 2009/0074240 A1 | 3/2009 | Srinivasan | |
| 2010/0046795 A1 | 2/2010 | Srinivasan | |
| 2012/0022879 A1 | 1/2012 | Srinivasan | |
| 2012/0039504 A1 | 2/2012 | Srinivasan | |

FOREIGN PATENT DOCUMENTS

| | | |
|---|---|---|
| CN | 1266586 | 9/2000 |
| CN | 1276936 | 12/2000 |
| CN | 101950561 | 1/2011 |
| CN | 102592638 | 7/2012 |
| EP | 0651554 | 5/1995 |
| EP | 1104969 | 6/2001 |
| FR | 2820573 | 8/2002 |
| WO | 9837513 | 8/1998 |
| WO | 9963443 | 12/1999 |
| WO | 0022605 | 4/2000 |
| WO | 0064094 | 10/2000 |
| WO | 0157783 | 8/2001 |
| WO | 0217214 | 2/2002 |
| WO | 0249363 | 6/2002 |
| WO | 02060182 | 8/2002 |
| WO | 02063609 | 8/2002 |
| WO | 03009602 | 1/2003 |
| WO | 2005002200 | 1/2005 |
| WO | 2005008582 | 1/2005 |
| WO | 2005099385 | 10/2005 |
| WO | 2006014362 | 2/2006 |

OTHER PUBLICATIONS

Advanced Television Systems Committee, “ATSC Standard: Digital Audio Compression (AC-3), Revision A,” Washington, D.C., USA, Dec. 20, 1995 (140 pages).

Cheng et al., “Enhanced Spread Spectrum Watermarking of MPEG-2, AAC Audio,” Department of Electrical Engineering, Texas A&M University, College Station, T.X., U.S.A, and Panasonic Information and Networking Technologies Lab, Princeton, NJ, USA, pp. IV-3728-IV-3731, 2002 (4 pages).

Cheung, W.N., “Digital Image Watermarking in Spatial and Transform Domains,” Centre for Advanced Telecommunications and Quantum Electronics Research, University of Canberra, Australia, 2000 (6 pages).

Chiariglione, Leonardo, “International Organisation for Standardisation Organisation Internationale de Normalisation,” ISO/IEC JTC 1/SC 29/WG 11 N3954, Resolutions of 56th WG 11 Meeting, Mar. 2001, (21 pages).

Davidson, Grant A., “Digital Audio Coding: Dolby AC-3,” pp. 41-1-41-21, CRC Press LLC, 1998 (22 pages).

De Smet et al., “Subband Based MPEG Audio Mixing for Intemet Streaming Applications,” 2001 ICASSP (4 pages).

Decarmo, Linden, “Pirates on the Airwaves,” www.emedialive.com, Sep. 1999 (8 pages).

Fraunhofer Institute for Integrated Circuits, “Audio and Multimedia Watermarking,” www.iis.fraunhoder.de/amm/techinf/water, 1998 (7 pages).

Hartung et al., “Watermarking of Uncompressed and Compressed Video,” Telecommunications Institute I, University of Erlangen-Nuremberg, Germany, 1998 (26 pages).

Haskell et al., “Digital Video: An Introduction to MPEG-2,” pp. 55-79, 1996 (26 pages).

Herre et al., “Audio Watermarking in the Bitstream Domain,” Fraunhofer Institute for Integrated Circuits (FhG-IIS), Enlangen, Germany; Signal and Image Processing Lab 25th Anniversary's Project Presentation and Workshop held on Jun. 12 and 13, 2000 (23 pages).

Lacy et al., “On Combining Watermarking with Perceptual Coding,” AT&T Labs, Florham Park, NJ., USA, pp. 3725-3728, 1998 (4 pages).

Liang et al., “Video Watermarking Combining with Hybrid Coding Scheme,” Department of E.E., Fudan University, Shanghai, China, 2002 (5 pages).

Princen et al., “Analysis/Synthesis Filter Bank Design Based on Time Domain Aliasing Cancellation,” IEEE Transactions on Acoustics, Speech, and Signal Processing, vol. ASSP=34, No. 5, Oct. 1986 (9 pages).

Stautner, John P., “Scalable Audio Compression for Mixed Computing Environments,” Aware, Inc., Cambridge, MA, USA, Presented at the 93rd Convention for An Audio Engineering Society held in San Francisco, CA, USA, on Oct. 1-4, 1992 (4 pages).

Touimi et al., “A summation Algorithm for MPEG-1 Coded Audio Signals: A First Step Towards Audio Processing in the Compressed Domain,” Annals of Telecommunications, vol. 55, No. 3-4, Mar. 1, 2000 (10 pages).

USPTO, “Non-Final Office Action,” issued in connection with U.S. Appl. No. 11/298,040, on May 15, 2008 (15 pages).

USPTO, “Notice of Allowance,” issued in connection with U.S. Appl. No. 11/298,040, on Aug. 22, 2008 (8 pages).

USPTO, “Notice of Allowance,” issued in connection with U.S. Appl. No. 12/269,733, on Aug. 6, 2009 (9 pages).

USPTO, “Non-Final Office Action,” issued in connection with U.S. Appl. No. 12/613,334, on Nov. 15, 2010 (10 pages).

USPTO, “Non-Final Office Action,” issued in connection with U.S. Appl. No. 12/613,334, on Apr. 26, 2011 (7 pages).

USPTO, “Notice of Allowance,” issued in connection with U.S. Appl. No. 12/613,334, on Oct. 13, 2011 (10 pages).

(56) References Cited

OTHER PUBLICATIONS

USPTO, "Non-Final Office Action," issued in connection with U.S. Appl. No. 13/283,271, on May 3, 2012 (6 pages).
USPTO, "Non-Final Office Action," issued in connection with U.S. Appl. No. 11/870,275, on Nov. 23, 2010 (37 pages).
USPTO, "Notice of Allowance," issued in connection with U.S. Appl. No. 11/870,275, on May 20, 2011 (5 pages).
USPTO, "Notice of Allowance," issued in connection with U.S. Appl. No. 11/870,275, on Sep. 26, 2011 (5 pages).
USPTO, "Supplemental Notice of Allowance," issued in connection with U.S. Appl. No. 11/870,275, mailed on Oct. 5, 2011 (3 pages).
Watson et al., "Design and Implementation of AAC Decoders," Dolby Laboratories, Inc., San Francisco, CA, USA, 2000 (2 pages).
Xu et al., "Content-Based Digital Watermarking for Compressed Audio," Department of Computer Science, The University of Sydney, New South Wales, Australia, 2006 (13 pages).
CIPO, "Office Action," issued in connection with Canadian Patent Application No. 2,529,310, on Apr. 6, 2011 (3 pages).
EPO, "Supplementary European Search Report," issued in connection with European Patent Application No. 05780308.2, Jun. 24, 2010 (5 pages).
EPO, "Supplementary European Search Report," issued in connection with European Patent Application No. 04776572.2, dated Aug. 31, 2011 (3 pages).
IP Australia, "Examiner's First Report," issued in connection with Australian Patent Application No. 2004258470, mailed on Sep. 5, 2008 (9 pages).
IP Australia, "Examiner's First Report," issued in connection with Australian Patent Application No. 2005270105, mailed on Feb. 22, 2010 (2 pages).
IP Australia, "Examiner's First Report," issued in connection with Australian Patent Application No. 2010200873, mailed on Aug. 11, 2011 (2 pages).
IP Australia, "Examiner's First Report," issued in connection with Australian Patent Application No. 2011203047, mailed on Feb. 8, 2012 (2 pages).
IP Australia, "Notice of Acceptance," issued in connection with Australian Patent Application No. 2004258470, mailed on Nov. 25, 2009 (3 pages).
IP Australia, "Notice of Acceptance," issued in connection with Australian Patent Application No. 2005270105, mailed on Mar. 18, 2011 (4 pages).
KIPO, "Notice of Allowance," issued in connection with Korean Patent Application No. 10-2007-7002769, dated Aug. 29, 2011 (3 pages).
MyIPO, "Substantive Examination Adverse Report," issued in connection with Malaysian Patent Application No. P120042284, mailed on Mar. 20, 2009 (3 pages).
PCT, "International Search Report and Written Opinion," issued in connection with PCT Application No. PCT/US2004/018645, mailed Apr. 19, 2005 (9 pages).
PCT, "International Preliminary Report on Patentability," issued in connection with PCT Application No. PCT/US2004/018953, mailed Jan. 4, 2006 (22 pages).
PCT, "International Search Report and Written Opinion," issued in connection with PCT Application No. PCT/US2005/023578, mailed on Jan. 11, 2006 (6 pages).
PCT, "International Preliminary Report on Patentability," issued in connection with PCT Application No. PCT/US2005/023578, completed on Aug. 25, 2006 (20 pages).
PCT, "International Search Report and Written Opinion," issued in connection with PCT Application No. PCT/US2007/080973, mailed on Apr. 23, 2008 (7 pages).
PCT, "International Preliminary Report on Patentability," issued in connection with PCT Application No. PCT/US2007/080973, mailed Apr. 23, 2009 (7 pages).
SIPO, "First Notification of Office Action," issued in connection with Chinese Patent Application No. 200480020200.8, on Mar. 27, 2009 (11 pages).
SIPO, "Notice of Decision of Granting Patent Right for Invention," issued in connection with Chinese Patent Application No. 200480020200.8, issued on Jul. 23, 2010 (2 pages).
SIPO, "First Notification of Office Action," issued in connection with Chinese Patent Application No. 200580026107.2, issued on Jul. 11, 2008 (7 pages).
SIPO, "Second Notification of Office Action," issued in connection with Chinese Patent Application No. 200580026107.2, issued on Jun. 9, 2011 (6 pages).
SIPO, "First Notification of Office Action," issued in connection with Chinese Patent Application No. 201010501205.X, on Mar. 15, 2011 (7 pages).
TIPO, "Office Action," issued in connection with counterpart PCT Application No. 93117000, mailed Nov. 4, 2010 (6 pages).
TIPO, "Notice of Allowance," issued in connection with Taiwanese Application No. 93117000, mailed Feb. 23, 2011 (3 pages).
European Patent Office, "Extended Search Report," issued in connection with European Application No. 07844106.0, dated May 17, 2013 (6 pages).
IP Australia, "First Examiner's Report," issued in connection with Australian Patent Application No. 2012261653, dated Jan. 29, 2014 (3 pages).
Canadian Intellectual Property Office, "Office Action," issued in connection with Canadian Application No. 2,572,622, dated May 3, 2013, (3 pages).
Government of India Patent Office, "First Examination Report," issued in connection with IN Patent Application No. 465/DEL NP/2007, dated Nov. 26, 2013, 2 pages.
European Patent Office, "Examination Report" issued in connection with European Application No. 07844106.0, dated Feb. 5, 2014, (6 pages).
Canadian Intellectual Property Office, "Notice of Allowance," issued in connection with Canadian Patent Application No. 2,529,310, on Mar. 8, 2012 (1 page).
European Patent Office, "Examination Report," issued in connection with European Patent Application No. 04776572.2, dated Apr. 25, 2012 (4 pages).
European Patent Office, "Examination Report," issued in connection with European Patent Application No. 05780308.2, dated Nov. 18, 2011 (9 pages).
European Patent Office, "Summons to Attend Oral Proceedings Pursuant to Rule 115(1) EPC," issued in connection with European Patent Application No. 05780308.2, dated Jan. 2, 2013 (4 pages).
European Patent Office, "Intention to Grant Pursuant to Rule 71(3) EPC," issued in connection with European Patent Application No. 05780308.2, dated Apr. 8, 2013 (69 pages).
IP Australia, "Notice of Acceptance," issued in connection with Australian Patent Application No. 2010200873, mailed on Aug. 22, 2012 (3 pages).
IP Australia, "Notice of Acceptance," issued in connection with Australian Patent Application No. 2011203047, mailed on Mar. 5, 2013 (2 pages).
PCT, "International Preliminary Report on Patentability," issued in connection with PCT Application No. PCT/US2004/018645, mailed Dec. 13, 2005 (6 pages).
PCT, "International Search Report and Written Opinion," issued in connection with PCT Application No. PCT/US2004/018953, mailed Apr. 29, 2005 (8 pages).
SIPO, "Second Notification of Office Action," issued in connection with Chinese Patent Application No. 201010501205.X, on Feb. 20, 2012 (6 pages).
SIPO, "Notice of Decision of Granting Patent Right for Invention," issued in connection with Chinese Patent Application No. 201010501205.X, on Aug. 30, 2012 (3 pages).
SIPO, "Notice of Decision of Granting Patent Right for Invention," issued in connection with Chinese Patent Application No. 200580026107.2, issued on Oct. 20, 2011 (4 pages).
United States Patent and Trademark Office, "Notice of Allowance", issued in connection with U.S. Appl. No. 13/708,262, dated Mar. 6, 2014 (9 pages).
SIPO, "First Office Action", issued in connection with corresponding Chinese Patent Application No. 201110460586.6, dated Mar. 5, 2014 (13 pages).

(56) References Cited

OTHER PUBLICATIONS

United States Patent and Trademark Office, "Notice of Allowance", issued in connection with U.S. Appl. No. 13/283,271, dated Sep. 18, 2012 (11 pages).
United States Patent and Trademark Office, "Office Action", issued in connection with U.S. Appl. No. 11/571,483, dated Jun. 13, 2012 (12 pages).
United States Patent and Trademark Office, "Notice of Allowance", issued in connection with U.S. Appl. No. 11/571,483, dated Nov. 30, 2012 (5 pages).
United States Patent and Trademark Office, "Office Action", issued in connection with U.S. Appl. No. 13/708,262, dated Aug. 19, 2013 (39 pages).
Hartung et al., "Digital Watermarking of MPEG-2 Coded Video in the Bitstream Domain," IEEE, 1997 (4 pages).
Swanson et al., "Transparent Robust Image Watermarking," IEEE, 1996 (4 pages).
Cox et al., "Secure Spread Spectrum Watermarking for Multimedia," IEEE Transactions on Image Processing, vol. 6, No. 12, Dec. 1997 (15 pages).
Tirkel et al., "Image Watermarking—A Spread Spectrum Application," IEEE, 1996 (5 pages).
Silvestre et al., "Image Watermarking using Digital Communication Technology," IEE IPA97, Jul. 15-17, 1997 (5 pages).

METHODS AND APPARATUS FOR EMBEDDING CODES IN COMPRESSED AUDIO DATA STREAMS

RELATED APPLICATIONS

This patent is a continuation of U.S. patent application Ser. No. 11/870,275, entitled "Methods and Apparatus for Embedding Codes in Compressed Audio Data Streams," which was filed on Oct. 10, 2007, and which claims priority to U.S. Provisional Application No. 60/850,745, entitled "Encoding Systems and Methods for Compressed AAC Audio Bit Streams," which was filed Oct. 11, 2006. U.S. patent application Ser. No. 11/870,275 and U.S. Provisional Application No. 60/850,745 are hereby incorporated by reference in their respective entireties.

TECHNICAL FIELD

The present disclosure relates generally to audio encoding and, more particularly, to methods and apparatus for embedding codes in compressed audio data streams.

BACKGROUND

Compressed digital data streams are commonly used to carry video and/or audio data for transmission to receiving devices. For example, the well-known Moving Picture Experts Group (MPEG) standards (e.g., MPEG-1, MPEG-2, MPEG-3, MPEG-4, etc.) are widely used for carrying video content. Additionally, the MPEG Advanced Audio Coding (AAC) standard is a well-known compression standard used for carrying audio content. Audio compression standards, such as MPEG-AAC, are based on perceptual digital audio coding techniques that reduce the amount of data needed to reproduce the original audio signal while minimizing perceptible distortion. These audio compression standards recognize that the human ear is unable to perceive changes in spectral energy at particular spectral frequencies that are smaller than the masking energy at those spectral frequencies. The masking energy is a characteristic of an audio segment dependent on the tonality and noise-like characteristic of the audio segment. Different psycho-acoustic models may be used to determine the masking energy at a particular spectral frequency.

Many multimedia service providers, such as television or radio broadcast stations, employ watermarking techniques to embed watermarks within video and/or audio data streams compressed in accordance with one or more audio compression standards, including the MPEG-AAC compression standard. Typically, watermarks are digital data that uniquely identify service and/or content providers (e.g., broadcasters) and/or the media content itself. Watermarks are typically extracted using a decoding operation at one or more reception sites (e.g., households or other media consumption sites) and, thus, may be used to assess the viewing behaviors of individual households and/or groups of households to produce ratings information.

However, many existing watermarking techniques are designed for use with analog broadcast systems. In particular, existing watermarking techniques convert analog program data to an uncompressed digital data stream, insert watermark data in the uncompressed digital data stream, and convert the watermarked data stream to an analog format prior to transmission. In the ongoing transition towards an all-digital broadcast environment in which compressed video and audio streams are transmitted by broadcast networks to local affiliates, watermark data may need to be embedded or inserted directly in a compressed digital data stream. Existing watermarking techniques may decompress the compressed digital data stream into time-domain samples, insert the watermark data into the time-domain samples, and recompress the watermarked time-domain samples into a watermarked compressed digital data stream. Such a decompression/compression cycle may cause degradation in the quality of the media content in the compressed digital data stream. Further, existing decompression/compression techniques require additional equipment and cause delay of the audio component of a broadcast in a manner that, in some cases, may be unacceptable. Moreover, the methods employed by local broadcasting affiliates to receive compressed digital data streams from their parent networks and to insert local content through sophisticated splicing equipment prevent conversion of a compressed digital data stream to a time-domain (uncompressed) signal prior to recompression of the digital data streams.

DETAILED DESCRIPTION

In general, methods and apparatus for embedding watermarks in compressed digital data streams are disclosed herein. The methods and apparatus disclosed herein may be used to embed watermarks in compressed digital data streams without prior decompression of the compressed digital data streams. As a result, the methods and apparatus disclosed herein eliminate the need to subject compressed digital data streams to multiple decompression/compression cycles. Such decompression/recompression cycles are typically unacceptable to, for example, affiliates of television broadcast networks because multiple decompression/compression cycles may significantly degrade the quality of media content in the compressed digital data streams.

Prior to broadcast, for example, the methods and apparatus disclosed herein may be used to unpack the modified discrete cosine transform (MDCT) coefficient sets associated with a compressed digital data stream formatted according to a digital audio compression standard such as the MPEG-AAC compression standard. The unpacked MDCT coefficient sets may be modified to embed watermarks that imperceptibly augment the compressed digital data stream. A metering device at a media consumption site may extract the embedded watermark information from an uncompressed analog presentation of the audio content carried by the compressed digital data stream such as, for example, an audio presentation emanating from speakers of a television set. The extracted watermark information may be used to identify the media sources and/or programs (e.g., broadcast stations) associated with the media currently being consumed (e.g., viewed, listened to, etc.) at a media consumption site. In turn, the source and program identification information may be used to generate ratings information and/or any other information to assess the viewing behaviors associated with individual households and/or groups of households.

Figure 1:
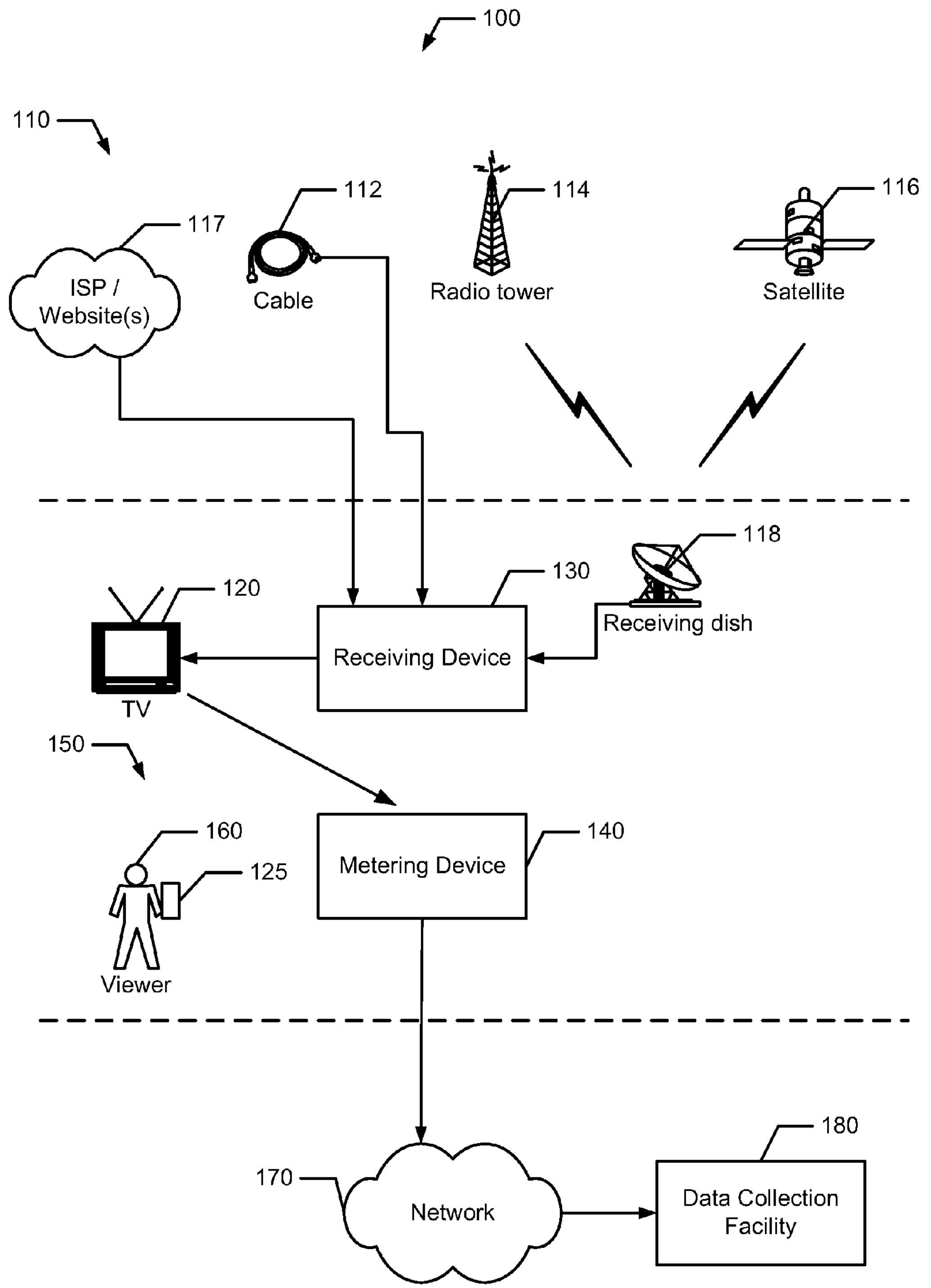
FIG. 1 is a block diagram representation of an example media monitoring system.

Referring to FIG. 1, an example broadcast system 100 including a service provider 110, a presentation device 120, a remote control device 125, and a receiving device 130 is metered using an audience measurement system. The components of the broadcast system 100 may be coupled in any well-known manner. For example, the presentation device 120 may be a television, a personal computer, an iPod®, an iPhone®, etc., positioned in a viewing area 150 located within a household occupied by one or more people, referred to as household members 160, some or all of whom have agreed to participate in an audience measurement research study. The receiving device 130 may be a set top box (STB), a video cassette recorder, a digital video recorder, a personal video recorder, a personal computer, a digital video disc player, an iPod®, an iPhone®, etc. coupled to or integrated with the presentation device 120. The viewing area 150 includes the area in which the presentation device 120 is located and from which the presentation device 120 may be viewed by the one or more household members 160 located in the viewing area 150.

In the illustrated example, a metering device 140 is configured to identify viewing information based on media content (e.g., video and/or audio) presented by the presentation device 120. The metering device 140 provides this viewing information, as well as other tuning and/or demographic data, via a network 170 to a data collection facility 180. The network 170 may be implemented using any desired combination of hardwired and/or wireless communication links including, for example, the Internet, an Ethernet connection, a digital subscriber line (DSL), a telephone line, a cellular telephone system, a coaxial cable, etc. The data collection facility 180 may be configured to process and/or store data received from the metering device 140 to produce ratings information.

The service provider 110 may be implemented by any service provider such as, for example, a cable television service provider 112, a radio frequency (RF) television service provider 114, a satellite television service provider 116, an Internet service provider (ISP) and/or web content provider (e.g., website) 117, etc. In an example implementation, the presentation device 120 is a television 120 that receives a plurality of television signals transmitted via a plurality of channels by the service provider 110. Such a television set 120 may be adapted to process and display television signals provided in any format, such as a National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc.

The user-operated remote control device 125 allows a user (e.g., the household member 160) to cause the presentation device 120 and/or the receiver 130 to select/receive signals and/or present the programming/media content contained in the selected/received signals. The processing performed by the presentation device 120 may include, for example, extracting a video and/or an audio component delivered via the received signal, causing the video component to be displayed on a screen/display associated with the presentation device 120, causing the audio component to be emitted by speakers associated with the presentation device 120, etc. The programming content contained in the selected/received signal may include, for example, a television program, a movie, an advertisement, a video game, a web page, a still image, and/or a preview of other programming content that is currently offered or will be offered in the future by the service provider 110.

While the components shown in FIG. 1 are depicted as separate structures within the broadcast system 100, the functions performed by some or all of these structures may be integrated within a single unit or may be implemented using two or more separate components. For example, although the presentation device 120 and the receiving device 130 are depicted as separate structures, the presentation device 120 and the receiving device 130 may be integrated into a single unit (e.g., an integrated digital television set, a personal computer, an iPod®, an iPhone®, etc.). In another example, the presentation device 120, the receiving device 130, and/or the metering device 140 may be integrated into a single unit.

To assess the viewing behaviors of individual household members 160 and/or groups of households, a watermark embedding system (e.g., the watermark embedding system 200 of FIG. 2) may encode watermarks that uniquely identify providers and/or media content associated with the selected/received media signals from the service providers 110. The watermark embedding system may be implemented at the service provider 110 so that each of the plurality of media signals (e.g., Internet data streams, television signals, etc.) provided/transmitted by the service provider 110 includes one or more watermarks. Based on selections by the household members 160, the receiving device 130 may select/receive media signals and cause the presentation device 120 to present the programming content contained in the selected/received signals. The metering device 140 may identify watermark information included in the media content (e.g., video/audio) presented by the presentation device 120. Accordingly, the metering device 140 may provide this watermark information as well as other monitoring and/or demographic data to the data collection facility 180 via the network 170.

Figure 2:
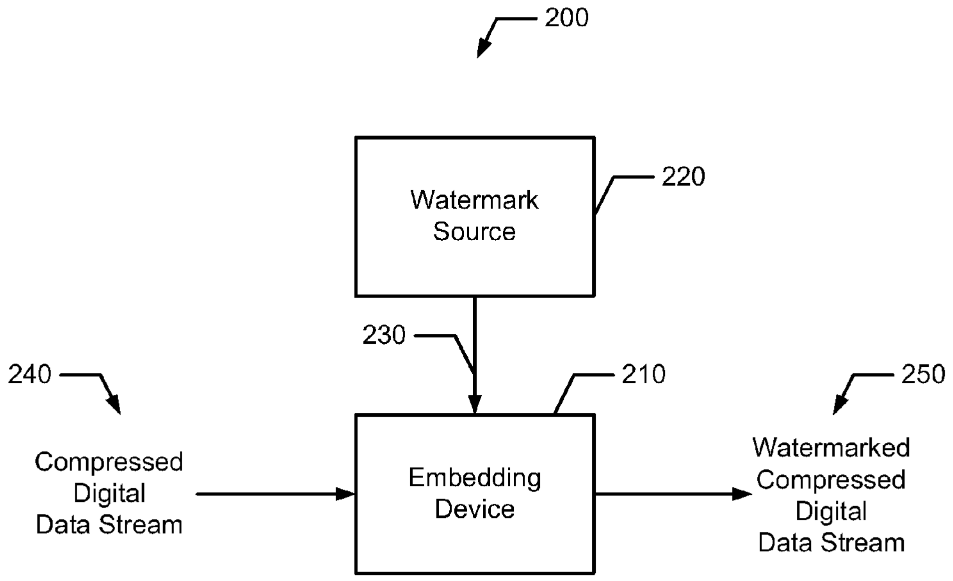
FIG. 2 is a block diagram representation of an example watermark embedding system.

In FIG. 2, an example watermark embedding system 200 includes an embedding device 210 and a watermark source 220. The embedding device 210 is configured to insert watermark information 230 from the watermark source 220 into a compressed digital data stream 240. The compressed digital data stream 240 may be compressed according to an audio compression standard such as the MPEG-AAC compression standard, which may be used to process blocks of an audio signal using a predetermined number of digitized samples from each block. The source of the compressed digital data stream 240 (not shown) may be sampled at a rate of, for example, 44.1 or 48 kilohertz (kHz) to form audio blocks as described below.

Typically, audio compression techniques such as those based on the MPEG-AAC compression standard use overlapped audio blocks and the MDCT algorithm to convert an audio signal into a compressed digital data stream (e.g., the compressed digital data stream 240 of FIG. 2). Two different block sizes (i.e., AAC short and AAC long blocks) may be used depending on the dynamic characteristics of the sampled audio signal. For example, AAC short blocks may be used to minimize pre-echo for transient segments of the audio signal and AAC long blocks may be used to achieve high compression gain for non-transient segments of the audio signal. In accordance with the MPEG-AAC compression standard, an AAC long block corresponds to a block of 2048 time-domain audio samples, whereas an AAC short block corresponds to 256 time-domain audio samples. Based on the overlapping structure of the MDCT algorithm used in the MPEG-AAC compression standard, in the case of the AAC long block, the 2048 time-domain samples are obtained by concatenating a preceding (old) block of 1024 time-domain samples and a current (new) block of 1024 time-domain samples to create an audio block of 2048 time-domain samples. The AAC long block is then transformed using the MDCT algorithm to generate 1024 transform coefficients. In accordance with the same standard, an AAC short block is similarly obtained from a pair of consecutive time-domain sample blocks of audio. The AAC short block is then transformed using the MDCT algorithm to generate 128 transform coefficients.

Figure 3:
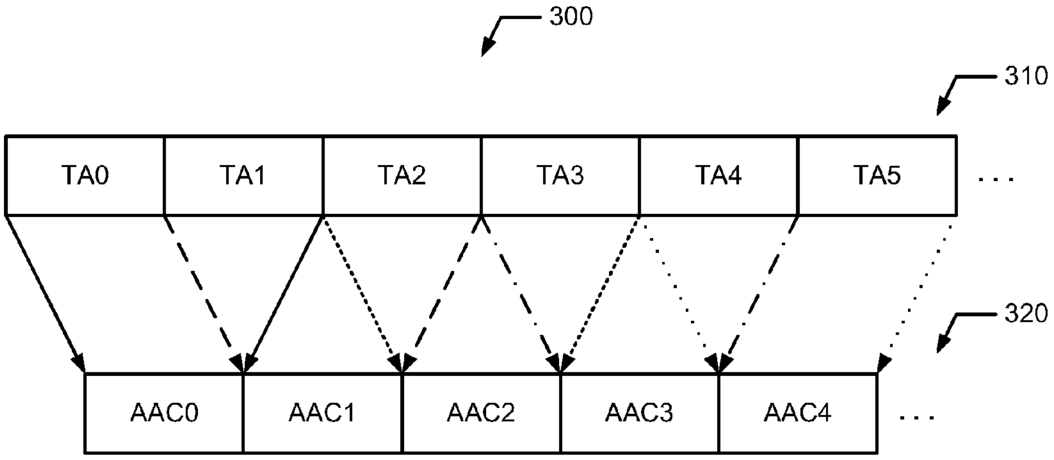
FIG. 3 is a block diagram representation of an example uncompressed digital data stream associated with the example watermark embedding system of FIG. 2.

In the example of FIG. 3, an uncompressed digital data stream 300 includes a plurality of 1024-sample time-domain audio blocks 310, generally shown as TA0, TA1, TA2, TA3, TA4, and TA5. The MDCT algorithm processes the audio blocks 310 to generate MDCT coefficient sets 320, also referred to as AAC frames 320 herein, shown by way of example as AAC0, AAC1, AAC2, AAC3, AAC4, and AAC5 (where AAC5 is not shown). For example, the MDCT algorithm may process the audio blocks TA0 and TA1 to generate the AAC frame AAC0. The audio blocks TA0 and TA1 are concatenated to generate a 2048-sample audio block (e.g., an AAC long block) that is transformed using the MDCT algorithm to generate the AAC frame AAC0 which includes 1024 MDCT coefficients. Similarly, the audio blocks TA1 and TA2 may be processed to generate the AAC frame AAC1. Thus, the audio block TA1 is an overlapping audio block because it is used to generate both the AAC frame AAC0 and AAC1. In a similar manner, the MDCT algorithm is used to transform the audio blocks TA2 and TA3 to generate the AAC frame AAC2, the audio blocks TA3 and TA4 to generate the AAC frame AAC3, the audio blocks TA4 and TA5 to generate the AAC frame AAC4, etc. Thus, the audio block TA2 is an overlapping audio block used to generate the AAC frames AAC1 and AAC2, the audio block TA3 is an overlapping audio block used to generate the AAC frames AAC2 and AAC3, the audio block TA4 is an overlapping audio block used to generate the AAC frames AAC3 and AAC4, etc. Together, the AAC frames 320 form the compressed digital data stream 240.

As described in detail below, the embedding device 210 of FIG. 2 may embed or insert the watermark information or watermark 230 from the watermark source 220 into the compressed digital data stream 240. The watermark 230 may be used, for example, to uniquely identify providers (e.g., broadcasters) and/or media content (e.g., programs) so that media consumption information (e.g., viewing information) and/or ratings information may be produced. Accordingly, the embedding device 210 produces a watermarked compressed digital data stream 250 for transmission.

Figure 4:
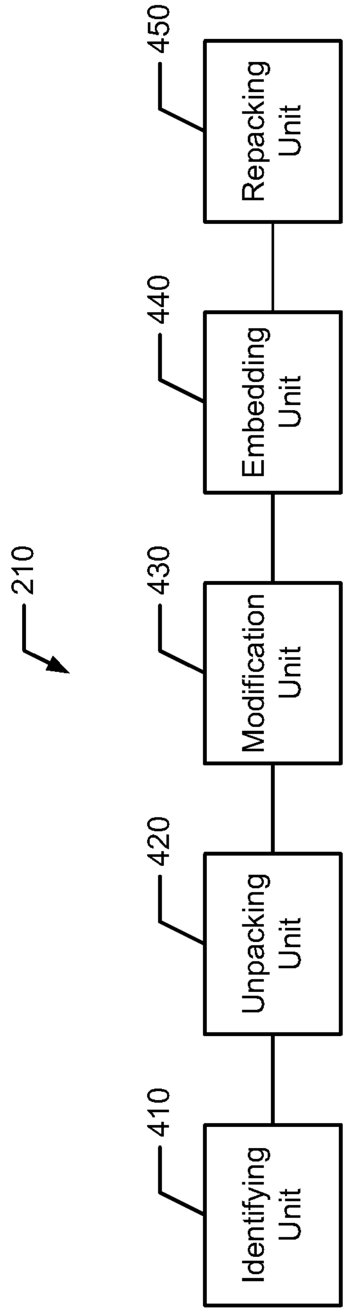
FIG. 4 is a block diagram representation of an example embedding device that may be used to implement watermark embedding for the example watermark embedding system of FIG. 2.

In the example of FIG. 4, the embedding device 210 includes an identifying unit 410, an unpacking unit 420, a modification unit 430, an embedding unit 440 and a repacking unit 450. Referring to both FIGS. 4 and 5, the identifying unit 410 is configured to identify one or more AAC frames 520 associated with the compressed digital data stream 240. As mentioned previously, the compressed digital data stream 240 may be a digital data stream compressed in accordance with the MPEG-AAC standard (hereinafter, the "AAC data stream 240"). While the AAC data stream 240 may include multiple channels, for purposes of clarity, the following example describes the AAC data stream 240 as including only one channel. In the illustrated example, the AAC data stream 240 is segmented into a plurality of MDCT coefficient sets 520, also referred to as AAC frames 520 herein.

The identifying unit 410 is also configured to identify header information associated with each of the AAC frames 520, such as, for example, the number of channels associated with the AAC data stream 240. While the example AAC data stream 240 includes only one channel as noted above, an example compressed digital data stream may include multiple channels.

Next, the unpacking unit 420 is configured to unpack the AAC frames 520 to determine compression information such as, for example, the parameters of the original compression process (i.e., the manner in which an audio compression technique compressed the audio signal or audio data to form the compressed digital data stream 240). For example, the unpacking unit 420 may determine how many bits are used to represent each of the MDCT coefficients within the AAC frames 520. Additionally, compression parameters may include information that limits the extent to which the AAC data stream 240 may be modified to ensure that the media content conveyed via the AAC data stream 240 is of a sufficiently high quality level. The embedding device 210 subsequently uses the compression information identified by the unpacking unit 420 to embed/insert the desired watermark information 230 into the AAC data stream 240, thereby ensuring that the watermark insertion is performed in a manner consistent with the compression information supplied in the signal.

As described in detail in the MPEG-AAC compression standard, the compression information also includes a mantissa and a scale factor associated with each MDCT coefficient. The MPEG-AAC compression standard employs techniques to reduce the number of bits used to represent each MDCT coefficient. Psycho-acoustic masking is one factor that may be utilized by these techniques. For example, the presence of audio energy $E_k$ either at a particular frequency k (e.g., a tone) or spread across a band of frequencies proximate to the particular frequency k (e.g., a noise-like characteristic) creates a masking effect. That is, the human ear is unable to perceive a change in energy in a spectral region either at a frequency k or spread across the band of frequencies proximate to the frequency k if that change is less than a given energy threshold $\Delta E_k$. Because of this characteristic of the human ear, an MDCT coefficient $m_k$ associated with the frequency k may be quantized with a step size related to $\Delta E_k$ without risk of causing any humanly perceptible changes to the audio content. For the AAC data stream 240, each MDCT coefficient $m_k$ is represented as a mantissa $M_k$ and a scale factor $S_k$ such that $m_k = M_k \cdot S_k$. The scale factor is further represented as $S_k = c_k \cdot 2^{x_k}$, where $c_k$ is a fractional multiplier called the "frac" part and $x_k$ is an exponent called the "exp" part. The MPEG-AAC compression algorithm makes use of several techniques to decrease the number of bits needed to represent each MDCT coefficient. For example, because a group of successive coefficients will have approximately the same order of magnitude, a single scale factor value is transmitted for a group of adjacent MDCT coefficients. Additionally, the mantissa values are quantized and represented using optimum Huffman code books applicable to an entire group. As described in detail below, the mantissa $M_k$ and scale factor $S_k$ are analyzed and changed, if appropriate, to create a modified MDCT coefficient for embedding a watermark in the AAC data stream 240.

Next, the modification unit 430 is configured to perform an inverse MDCT transform on each of the AAC frames 520 to generate time-domain audio blocks 530, shown by way of example as TA0', TA3", TA4', TA4", TA5', TA5", TA6', TA6", TA7', TA7", and TA11' (TA0" through TA3' and TA8' through TA10" are not shown). The modification unit 430 performs inverse MDCT transform operations to generate sets of previous (old) time-domain audio blocks (which are represented as prime blocks) and sets of current (new) time-domain audio blocks (which are represented as double-prime blocks) corresponding to the 1024-sample time-domain audio blocks that were concatenated to form the AAC frames 520 of the AAC data stream 240. For example, the modification unit 430 performs an inverse MDCT transform on the AAC frame AAC5 to generate time-domain blocks TA4" and TA5', the AAC frame AAC6 to generate TA5" and TA6', the AAC frame AAC7 to generate TA6" and TA7', etc. In this manner, the modification unit 430 generates reconstructed time-domain audio blocks 540, which provide a reconstruction of the original time-domain audio blocks that were compressed to form the AAC data stream 240. To generate the reconstructed time-domain audio blocks 540, the modification unit 430 may add time-domain audio blocks based on, for example, the known Princen-Bradley time domain alias cancellation (TDAC) technique as described in Princen et al., *Analysis/Synthesis Filter Bank Design Based on Time Domain Aliasing Cancellation*, Institute of Electrical and Electronics Engineers (IEEE) Transactions on Acoustics, Speech and Signal Processing, Vol. ASSP-35, No. 5, pp. 1153-1161 (1996). For example, the modification unit 430 may reconstruct the time-domain audio block TA5 (i.e., TA5R) by adding the prime time-domain audio block TA5' and the double-prime time-domain audio block TA5" using the Princen-Bradley TDAC technique. Likewise, the modification unit 430 may reconstruct the time-domain audio block TA6 (i.e., TA6R) by adding the prime audio block TA6' and the double-prime audio block TA6" using the Princen-Bradley TDAC technique.

The modification unit 430 is also configured to insert the watermark 230 into the reconstructed time-domain audio blocks 540 to generate watermarked time-domain audio blocks 550, shown by way of example as TA0W, TA4W, TA5W, TA6W, TA7W and TA11W (blocks TA1W, TA2W, TA3W, TA8W, TA9W and TA10W are not shown). To insert the watermark 230, the modification unit 430 generates a modifiable time-domain audio block by concatenating two adjacent reconstructed time-domain audio blocks to create a 2048-sample audio block. For example, the modification unit 430 may concatenate the reconstructed time-domain audio blocks TA5R and TA6R (each being a 1024-sample audio block) to form a 2048-sample audio block. The modification unit 430 may then insert the watermark 230 into the 2048-sample audio block formed by the reconstructed time-domain audio blocks TA5R and TA6R to generate the temporary watermarked time-domain audio blocks TA5X and TA6X. Encoding processes such as those described in U.S. Pat. Nos. 6,272,176, 6,504,870, and 6,621,881 may be used to insert the watermark 230 into the reconstructed time-domain audio blocks 540. The disclosures of U.S. Pat. Nos. 6,272,176, 6,504,870, and 6,621,881 are hereby incorporated by reference herein in their entireties. It is important to note that the modification unit 430 inserts the watermark 230 into the reconstructed time-domain audio blocks 540 for purposes of determining how the AAC data stream 240 will need to be modified to embed the watermark 230. The temporary watermarked time-domain audio blocks 550 are not recompressed for transmission via the AAC data stream 240.

In the example encoding methods and apparatus described in U.S. Pat. Nos. 6,272,176, 6,504,870, and 6,621,881, watermarks may be inserted into a 2048-sample audio block. In an example implementation, each 2048-sample audio block carries four (4) bits of embedded or inserted data of the watermark 230. To represent the 4 data bits, each 2048-sample audio block is divided into four (4), 512-sample audio blocks, with each 512-sample audio block representing one bit of data. In each 512-sample audio block, spectral frequency components with indices $f_1$ and $f_2$ may be modified or augmented to insert the data bit associated with the watermark 230. For example, to insert a binary "1," a power at the first spectral frequency associated with the index $f_1$ may be increased or augmented to be a spectral power maximum within a frequency neighborhood (e.g., a frequency neighborhood defined by the indices $f_1-2$, $f_1-1$, $f_1$, $f_1+1$, and $f_1+2$). At the same time, the power at the second spectral frequency associated with the index $f_2$ is attenuated or augmented to be a spectral power minimum within a frequency neighborhood (e.g., a frequency neighborhood defined by the indices $f_2-2$, $f_2-1$, $f_2$, $f_2+1$, and $f_2+2$). Conversely, to insert a binary "0," the power at the first spectral frequency associated with the index $f_1$ is attenuated to be a local spectral power minimum while the power at the second spectral frequency associated with the index $f_2$ is increased to a local spectral power maximum.

Next, based on the watermarked time-domain audio blocks 550, the modification unit 430 generates temporary watermarked MDCT coefficient sets 560, also referred to as temporary watermarked AAC frames 560 herein, shown by way of example as AAC0X, AAC4X, AAC5X, AAC0X and AAC11X (blocks AAC1X, AAC2X, AAC3X, AAC0X, AAC8X, AAC9X and AAC10X are not shown). For example, the modification unit 430 generates the temporary watermarked AAC frame AAC5X based on the temporary watermarked time-domain audio blocks TA5X and TA6X. Specifically, the modification unit 430 concatenates the temporary watermarked time-domain audio blocks TA5X and TA6X to form a 2048-sample audio block and converts the 2048-sample audio block into the watermarked AAC frame AAC5X which, as described in greater detail below, may be used to modify the original MDCT coefficient set AAC5.

The difference between the original AAC frames 520 and the temporary watermarked AAC frames 560 corresponds to a change in the AAC data stream 240 resulting from embedding or inserting the watermark 230. To embed/insert the watermark 230 directly into the AAC data stream 240 without decompressing the AAC data stream 240, the embedding unit 440 directly modifies the mantissa and/or scale factor values in the AAC frames 520 to yield resulting watermarked MDCT coefficient sets 570, also referred to as the resulting watermarked AAC frames 570 herein, that substantially correspond with the temporary watermarked AAC frames 560. For example, and as discussed in greater detail below, the example embedding unit 440 compares an original MDCT coefficient (e.g., represented as $m_k$) from the original AAC frames 520 with a corresponding temporary watermarked MDCT coefficient (e.g., represented as $xm_k$) from the temporary watermarked AAC frames 560. The example embedding unit 440 then modifies, if appropriate, the mantissa and/ or scale factor of the original MDCT coefficient ($m_k$) to form a resulting watermarked MDCT coefficient ($wm_k$) to include in the watermarked AAC frames 570. The mantissa and/or scale factor of the resulting watermarked MDCT coefficient ($wm_k$) yields a representation substantially corresponding to the temporary watermarked MDCT coefficient ($xm_k$). In particular, and as discussed in greater detail below, the example embedding unit 440 determines modifications to the mantissa and/or scale factor of the original MDCT coefficient ($m_k$) that substantially preserve the original compression characteristics of the AAC data stream 240 Thus, the new mantissa and/or scale factor values provide the change in or augmentation of the AAC data stream 240 needed to embed/insert the watermark 230 without requiring decompression and recompression of the AAC data stream 240.

The repacking unit 450 is configured to repack the watermarked AAC frames 570 associated with each AAC frame of the AAC data stream 240 for transmission. In particular, the repacking unit 450 identifies the position of each MDCT coefficient within a frame of the AAC data stream 240 so that the corresponding watermarked AAC frame 570 can be used to represent the original AAC frame 520. For example, the repacking unit 450 may identify the position of the AAC frames AAC0 to AAC5 and replace these frames with the corresponding watermarked AAC frames AAC0W to AAC5W. Using the unpacking, modifying, and repacking processes described herein, the AAC data stream 240 remains a compressed digital data stream while the watermark 230 is embedded/inserted in the AAC data stream 240. In other words, the embedding device 210 inserts the watermark 230 into the AAC data stream 240 without additional decompression/compression cycles that may degrade the quality of the media content in the AAC data stream 240. Additionally, because the watermark 230 modifies the audio content carried by the AAC data stream 240 (e.g., such as through modifying or augmenting one or more frequency components in the audio content as discussed above), the watermark 230 may be recovered from a presentation of the audio content without access to the watermarked AAC data stream 240 itself. For example, the receiving device 130 of FIG. 1 may receive the AAC data stream 240 and provide it to the presentation device 120. The presentation device 120, in turn, will decode the AAC data stream 240 and present the audio content contained therein to the household members 160. The metering device 140 may detect the imperceptible watermark 230 embedded in the audio content by processing the audio emissions from the presentation device 120 without access to the AAC data stream 240 itself.

Figure 5:
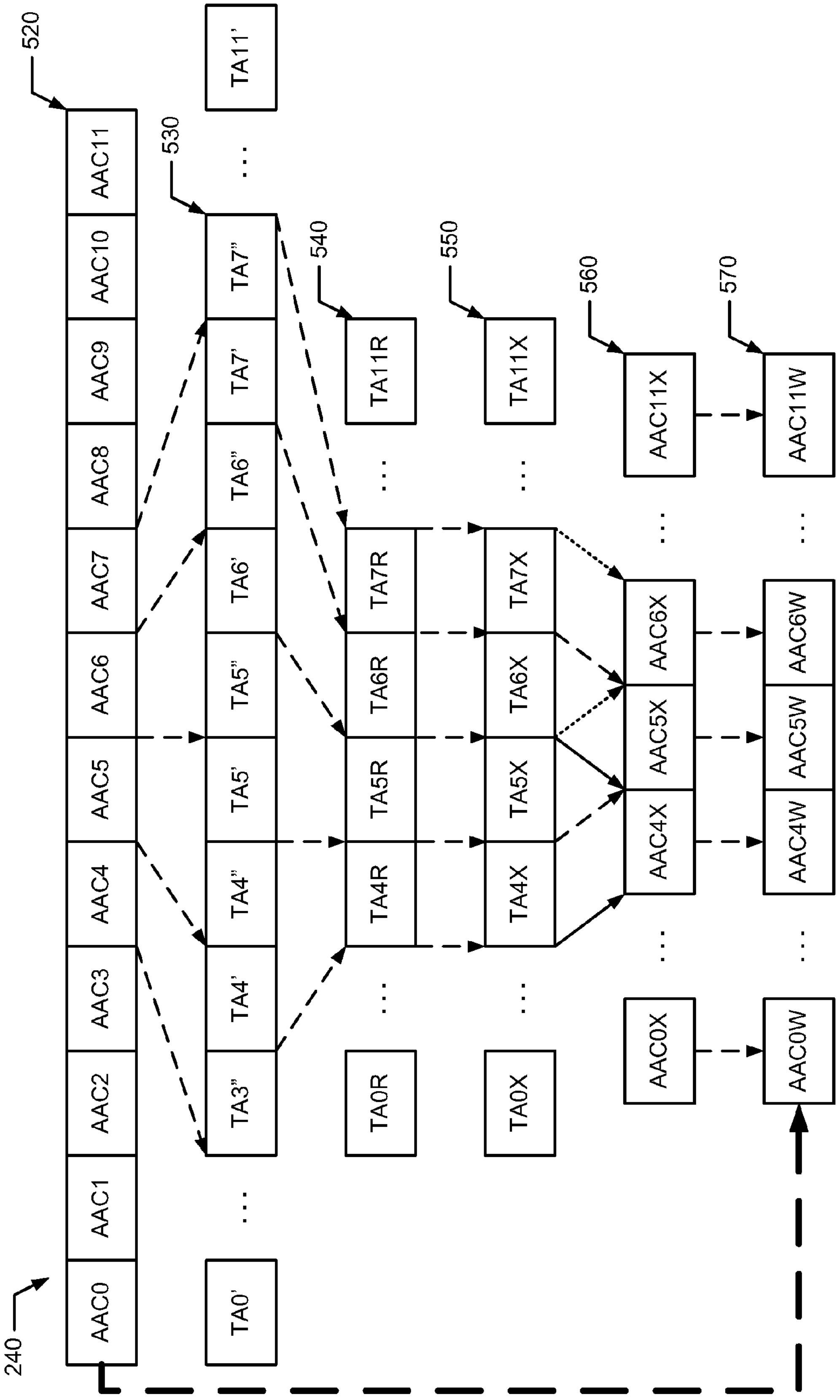
FIG. 5 depicts an example compressed digital data stream associated with the example embedding device of FIG. 4.
Figure 6:
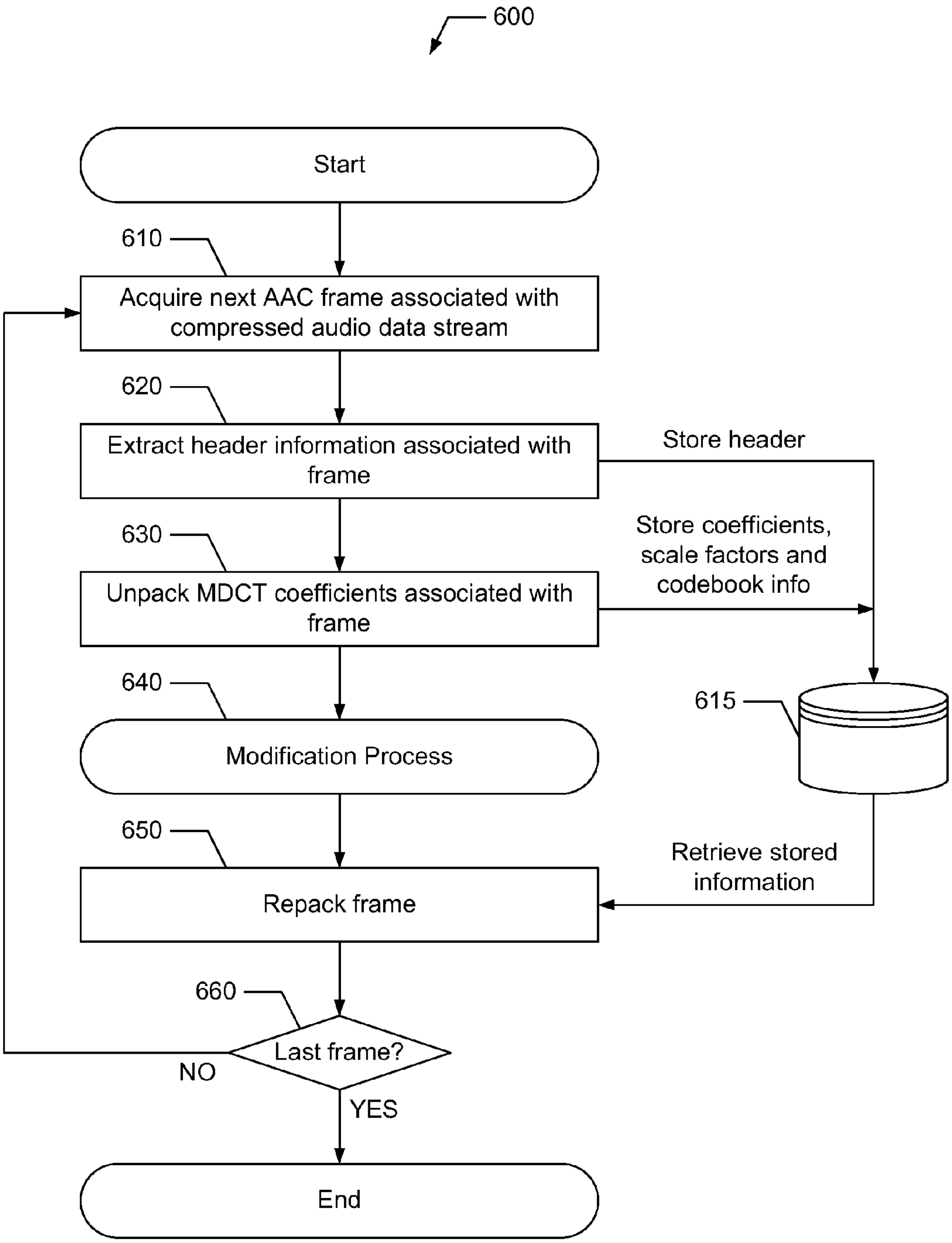
FIG. 6 depicts an example watermarking procedure that may be used to implement the example watermark embedding device of FIG. 4.
Figure 7:
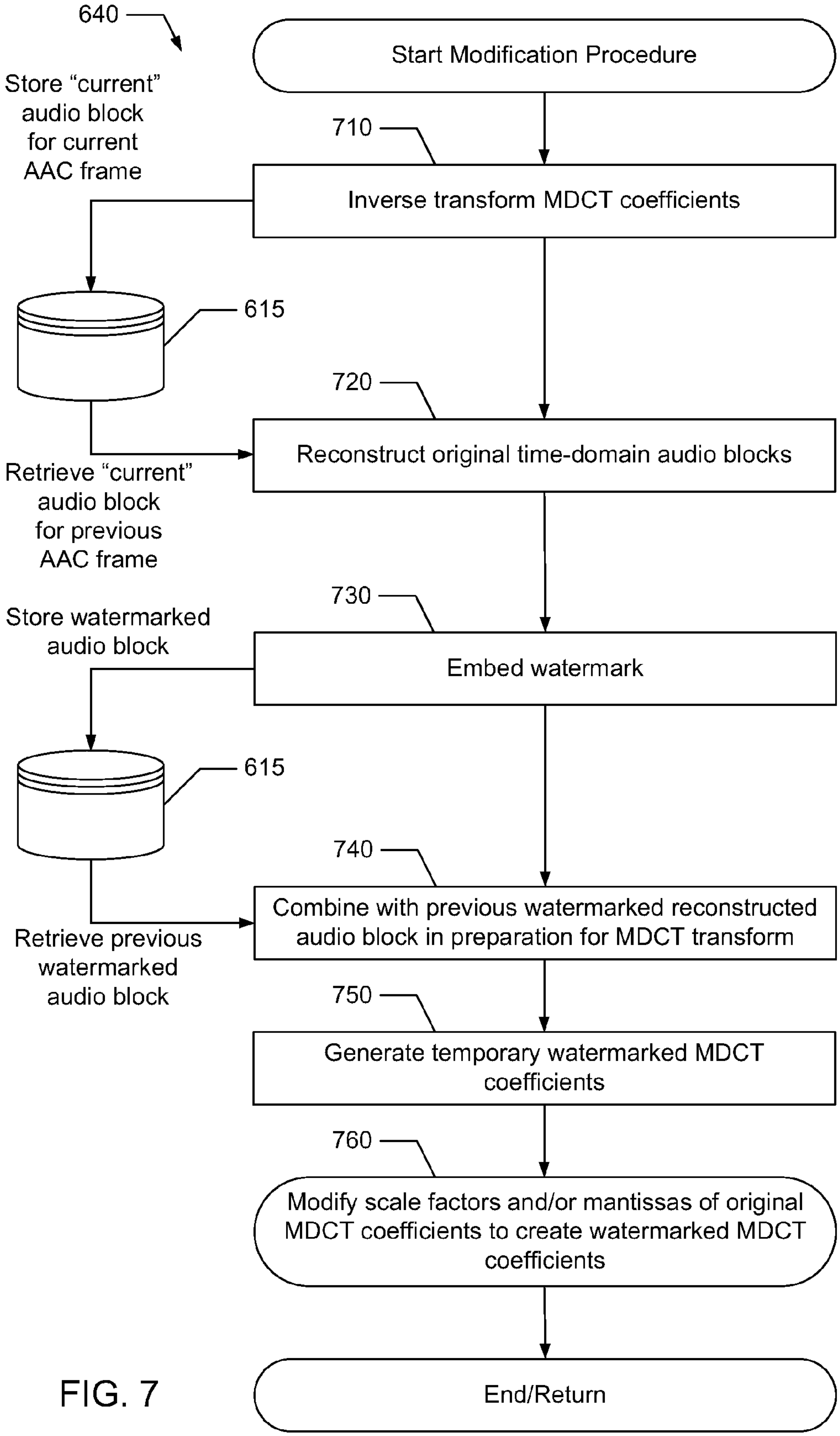
FIG. 7 depicts an example modification procedure that may be used to implement the example watermarking procedure of FIG. 6.
Figure 8:
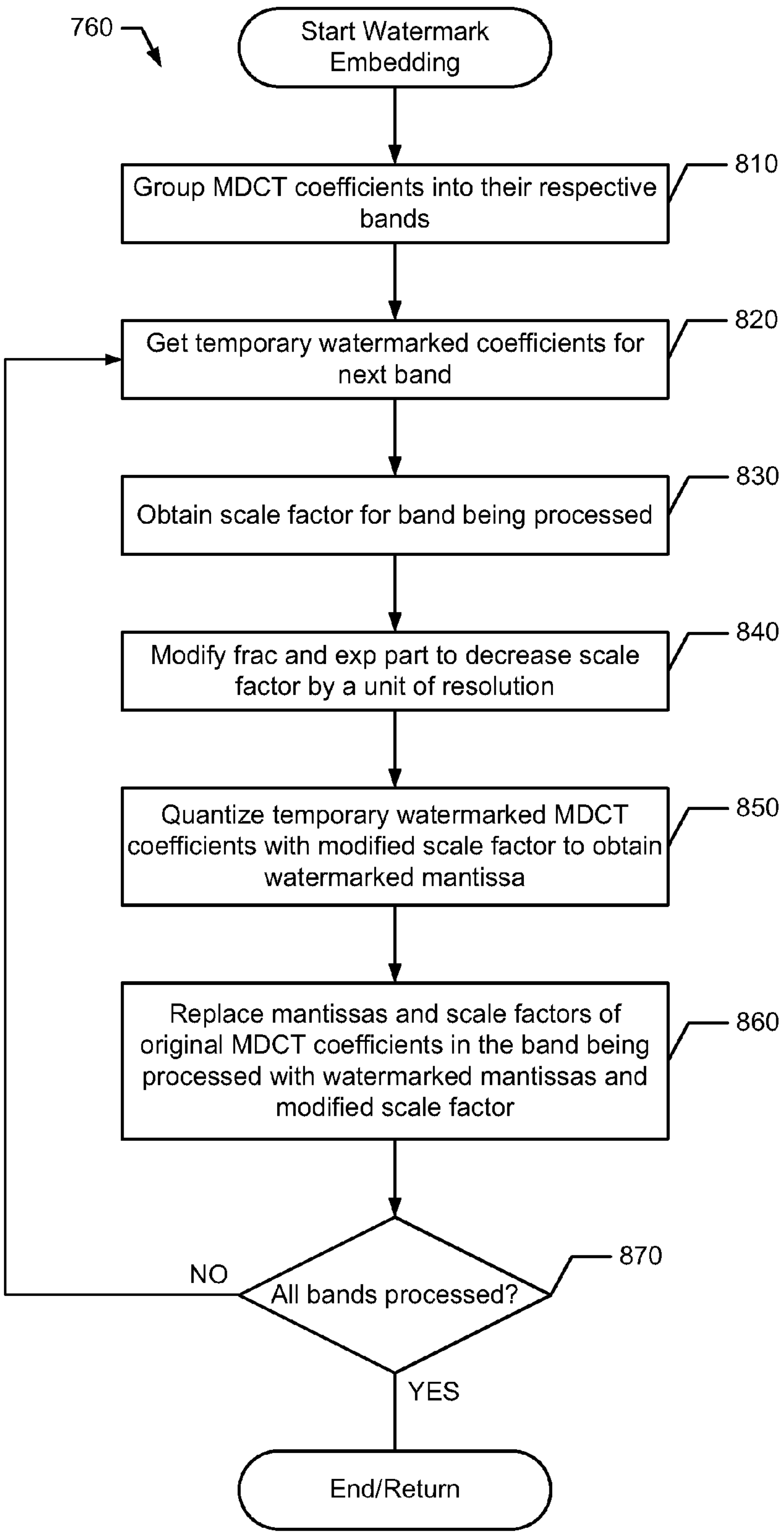
FIG. 8 depicts an example embedding procedure that may be used to implement the example modification procedure of FIG. 7.

FIGS. 6-8 are flow diagrams depicting example processes which may be used to implement the example watermark embedding device of FIG. 4 to embed or insert codes in a compressed audio data stream. The example processes of FIGS. 6-7 and/or 8 may be implemented as machine readable or accessible instructions utilizing any of many different programming codes stored on any combination of machine-accessible media, such as a volatile or nonvolatile memory or other mass storage device (e.g., a floppy disk, a CD, and a DVD). For example, the machine accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of operations is illustrated in FIGS. 6-8, these operations can be performed in other temporal sequences. Again, the processes illustrated in the flow diagrams of FIGS. 6-8 are merely provided and described in connection with the components of FIGS. 2 to 5 as examples of ways to configure a device/system to embed codes in a compressed audio data stream.

In the example of FIG. 6, the example process 600 begins with the identifying unit 410 (FIG. 4) of the embedding device 210 identifying a frame associated with the AAC data stream 240 (FIG. 2), such as one of the AAC frames 520 (FIG. 5) (block 610). The identified frame is selected for embedding one or more bits of data and includes a plurality of MDCT coefficients formed by overlapping, concatenating and transforming a plurality of audio blocks. In accordance with the illustrated example of FIG. 5, an example AAC frame 520 includes 1024 MDCT coefficients. Further, the identifying unit 410 (FIG. 4) also identifies header information associated with the AAC frame 520 being processed (block 620). For example, the identifying unit 410 may identify the number of channels associated with the AAC data stream 240, information concerning switching from long blocks to short blocks and vice versa, etc. The header information is stored in a storage unit 615 (e.g., a memory, database, etc.) associated with the embedding device 210.

The unpacking unit 420 then unpacks the plurality of MDCT coefficients included in the AAC frame 520 being processed to determine compression information associated with the original compression process used to generate the AAC data stream 240 (block 630). In particular, the unpacking unit 420 identifies the mantissa $M_k$ and the scale factor $S_k$ of each MDCT coefficient $m_k$ included in the AAC frame 520 being processed. The scale factors of the MDCT coefficients may then be grouped in a manner compliant with the MPEG-AAC compression standard. The unpacking unit 420 (FIG. 4) also determines the Huffman code book(s) and number of bits used to represent the mantissa of each of the MDCT coefficients so that the mantissas and scale factors for the AAC frame 520 being processed can be modified/augmented while maintaining the compression characteristics of the AAC data stream 240. The unpacking unit stores the MDCT coefficients, scale factors and Huffman codebooks (and/or pointers to this information) in the storage unit 615. Control then proceeds to block 640 which is described with reference to the example modification process 640 of FIG. 7.

As illustrated in FIG. 7, the modification process 640 begins by using the modifying unit 430 (FIG. 4) to perform an inverse transform of the MDCT coefficients included in the AAC frame 520 being processed to generate inverse transformed time-domain audio blocks (block 710). In a particular example of AAC long blocks, each unpacked AAC frame will include 1024 MDCT coefficients for each channel. At block 710, the modification unit 430 generates a previous (old) time-domain audio block (which, for example, is represented as a prime block in FIG. 5) and a current (new) time-domain audio block (which is represented as a double-prime block in FIG. 5) corresponding to the two (e.g., the previous and the new) 1024 sample original time-domain audio blocks used to generate the corresponding 1024 MDCT coefficients in the AAC frame. For example, as described in connection with FIG. 5, the modification unit 430 may generate TA4" and TA5' from the AAC frame AAC5, TA5" and TA6' from the AAC frame AAC6, and TA6" and TA7' from the AAC frame AAC7. The modification unit 430 then stores the current (new) time domain block (e.g., TA5', TA6', TA7', etc.) for the current AAC frame (e.g., AAC5, AAC6, AAC7, etc., respectively) in the storage unit 415 for use in processing the next AAC frame.

Next, for each time-domain audio block, and referring to the example of FIG. 5, the modification unit 430 adds corresponding prime and double-prime blocks to reconstruct time-domain audio block based on, for example, the Princen-Bradley TDAC technique (block 720). For example, at block 720 the modification unit 430 retrieves the current (new) time domain block stored for a previous MDCT coefficient during the immediately previous iteration of the processing at block 710 (e.g., such as TA5', TA6', TA7', etc., corresponding, respectively, to previously processed AAC frames AAC5, AAC6, AAC7, etc.). Then, the modification unit 430 adds the retrieved current (new) time domain block stored for the previous AAC frame to the previous (old) time domain block determined at block 710 for the current AAC frame 520 undergoing processing (e.g., such as TA4", TA11", TA6", etc., corresponding, respectively, to currently processed AAC frames AAC5, AAC6, AAC7, etc.) For example, and referring to FIG. 5, at block, 720 the prime block TA5' and the double-prime block TA5" may be added to reconstruct the time-domain audio block TA5 (i.e., the reconstructed time-domain audio block TA5R) while the prime block TA6' and the double-prime block TA6" may be added to reconstruct the time-domain audio block TA6 (i.e., the reconstructed time-domain audio block TA6R).

Next, to implement an encoding process such as, for example, one or more of the encoding methods and apparatus described in U.S. Pat. Nos. 6,272,176, 6,504,870, and/or 6,621,881, the modification unit 430 inserts the watermark 230 from the watermark source 220 into the reconstructed time-domain audio blocks (block 1030). For example, and referring to FIG. 5, the modification unit 430 may insert the watermark 230 into the 1024-sample reconstructed time-domain audio blocks TA5R to generate the temporary watermarked time-domain audio blocks TA5X.

Next, the modification unit 430 combines the watermarked reconstructed time-domain audio blocks determined at block 730 with previous watermarked reconstructed time-domain audio blocks determined during a previous iteration of block 730 (block 740). For example, in the case of AAC long block processing, the modification unit 430 thereby generates a 2048-sample time-domain audio block using two adjacent temporary watermarked reconstructed time-domain audio blocks. For example, and referring to FIG. 5, the modification unit 430 may generate a transformable time-domain audio block by concatenating the temporary time-domain audio blocks TA5X and TA6X.

Next, using the concatenated reconstructed watermarked time-domain audio blocks created at block 740, the modification unit 430 generates a temporary watermarked AAC frame, such as one of the temporary watermarked AAC frames 560 (block 750). As noted above, two watermarked time-domain audio blocks, where each block includes 1024 samples, may be used to generate a temporary watermarked AAC frame. For example, and referring to FIG. 5, the watermarked time-domain audio blocks TA5X and TA6X may be concatenated and then used to generate the temporary watermarked AAC frame AAC5X.

Next, based on the compression information associated with the AAC data stream 240, the embedding unit 440 determines the mantissa and scale factor values associated with each of the watermarked MDCT coefficients in the watermarked AAC frame AAC5W as described above in connection with FIG. 5. In other words, the embedding unit 440 directly modifies or augments the original AAC frames 520 through comparison with the temporary watermarked AAC frames 560 to create the resulting watermarked AAC frames 570 that embed or insert the watermark 230 in the compressed digital data stream 240 (block 760). Following the above example of FIG. 5, the embedding unit 440 may replace the original AAC frame AAC5 through comparison with the temporary watermarked AAC frame AAC5X to create the watermarked AAC frame AAC5W. In particular, the embedding unit 440 may replace an original MDCT coefficient in the AAC frame AAC5 with a corresponding watermarked MDCT coefficient (which has an augmented mantissa value and/or scale factor) from the watermarked AAC frame AAC5W. An example process for implementing the processing at block 760 is illustrated in FIG. 8 and discussed in greater detail below. Then, after processing at block 760 completes, the modification process 640 terminates and returns control to block 650 of FIG. 6.

Returning to FIG. 6, the repacking unit 450 repacks the AAC frame of the AAC data stream 240 (block 650). For example, the repacking unit 450 identifies the position of the MDCT coefficients within the AAC frame so that the modified MDCT coefficient set may be substituted in the positions of the original MDCT coefficient set to rebuild the frame. At block 660, if the embedding device 210 determines that additional frames of the AAC data stream 240 need to be processed, control then returns to block 610. If, instead, all frames of the AAC data stream 240 have been processed, the process 600 then terminates.

As noted above, known watermarking techniques typically decompress a compressed digital data stream into uncompressed time-domain samples, insert the watermark into the time-domain samples, and recompress the watermarked time-domain samples into a watermarked compressed digital data stream. In contrast, the AAC data stream 240 remains compressed during the example unpacking, modifying, and repacking processes described herein. As a result, the watermark 230 is embedded into the compressed digital data stream 240 without additional decompression/compression cycles that may degrade the quality of the content in the compressed digital data stream 500.

An example process 760 which may be executed to implement that processing at block 760 of FIG. 7 is illustrated in FIG. 8. The example process 760 may also be used to implement the example embedding unit 440 included in the example embedding device of FIG. 4. The example process 760 begins at block 810 at which the example embedding unit 440 groups the MDCT coefficients from the AAC frame 520 undergoing watermarking into their respective AAC bands. In accordance with the MPEG-AAC standard, groups of adjacent MDCT coefficients (e.g., such as four (4) coefficients) are grouped into bands. For example, to watermark the AAC frame AAC5 of FIG. 5, at block 810 the embedding unit 440 groups MDCT coefficients $m_k$ from the AAC frame AAC5 into their respective bands. Next, control proceeds to block 820 at which the embedding unit 440 gets the temporary watermarked MDCT coefficients corresponding to the next band to be processed from the AAC frame. Continuing with the preceding example, at block 820 the embedding unit may obtain the temporary watermarked coefficients $xm_k$ from the temporary watermarked AAC frame AAC5X corresponding to the next band of MDCT coefficients $m_k$ to be processed from the AAC frame AAC5. The temporary watermarked coefficients $xm_k$ may be obtained from, for example, the example modification unit 430 and/or the processing performed at block 750 of FIG. 7. Control then proceeds to block 830.

At block 830, the example embedding unit 440 obtains the scale factor for the band of MDCT coefficients $m_k$ being watermarked. In accordance with the MPEG-AAC standard, and as discussed above, each MDCT coefficient $m_k$ is represented as a mantissa $M_k$ and a scale factor $S_k$ such that $m_k=M_k \cdot S_k$. The scale factor is further represented as $S_k = c_k \cdot 2^{x_k}$, where $c_k$ is a fractional multiplier called the "frac" part and $x_k$ is an exponent called the "exp" part. Generally, the same scale factor is used for a section of MDCT coefficients $m_k$, wherein a section is formed by combining one or more adjacent coefficient bands. Each mantissa $M_k$ is an integer formed when the corresponding MDCT coefficient $m_k$ was quantized using a step size corresponding to the scale factor $S_k$. As discussed above in connection with FIG. 3, the original compressed AAC data stream 240 is formed by processing time-domain audio blocks 310 in the uncompressed digital data stream 300 with an MDCT transform. The resulting uncompressed MDCT coefficients are then quantized and encoded to generate the compressed MDCT coefficients 320 ($m_k$) forming the compressed digital data stream 240.

In a typical implementation, the scale factor $S_k$ is represented numerically as $S_k = x_k \cdot R + c_k$, where R is the range of the "frac" part, $c_k$. The "exp" and "frac" parts are then determined from the scale factor $S_k$ as $x_k = \lfloor S_k/R \rfloor$ and $c_k = S_k \%\ R$, where $\lfloor \bullet \rfloor$ represents rounding down to the nearest integer, and % represents the modulo operation. The "exp" and "frac" parts determined from the scale factor $S_k$ transmitted in the AAC data stream 240 are used to index lookup tables to determine an actual quantization step size corresponding to the scale factor $S_k$. For example, assume that four adjacent uncompressed MDCT coefficients formed by processing the uncompressed digital data stream 300 with an MDCT transform are given by:

$m_1$ (uncompressed)=208074.569, $m_2$ (uncompressed)=280104.336, $m_3$ (uncompressed)=1545799.909, and $m_4$ (uncompressed)=3054395.64.

These four adjacent uncompressed coefficients will form an AAC band. Next, assume that the MPEG-AAC algorithm determines that a scale factor $S_k=160$ should be used to quantize and, thus, compress the coefficients in this AAC band. In this example, the "frac" part of the scale factor $S_k$ can take on values of 0 through 3 and, therefore, the range of the "frac" part is 4. Using the preceding equations, the "exp" and "frac" part for the scale factor $S_k=160$ are $x_k = \lfloor S_k/R \rfloor = \lfloor 160/4 \rfloor = 40$ and $c_k = S_k \%\ R = 160\%4 = 0$. The "exp" part=40 is used to index an "exp" lookup table and returns a value of, for example, 32768. The "frac" part=0 is used to index a "frac" lookup table and returns a value of, for example, 1.0. The resulting actual step size for quantizing the uncompressed coefficients is determined by multiplying the two values returned from the lookup tables, resulting in an actual step size of 32768 for this example. Using this actual step size of 32768, the uncompressed coefficients are quantized to yield respective integer mantissas of:

$M_1=6$, $M_2=9$, $M_3=47$, and $M_4=93$.

To complete the formation of the compressed digital data stream 240, the compressed MDCT coefficients 320 having the quantized mantissa given above are encoded based on a Huffman codebook. For example, the MDCT coefficients belonging to an entire section are analyzed to determine the largest mantissa value for the section. An appropriate Huffman codebook is then selected which will yield a minimum number of bits for encoding the mantissas in the section. In the preceding example, the mantissa $M_4=93$ could be the largest in the section and used to select the appropriate codebook for representing the MDCT coefficients $m_1$ through $m_4$ corresponding to the mantissa values $M_1$ through $M_4$. The codebook index for this codebook is transmitted in the compressed digital data stream 240 to allow decoding of the MDCT coefficients.

Returning to block 830 of FIG. 8, the example embedding unit 440 obtains the scale factor corresponding for the band of MDCT coefficients $m_k$ being watermarked. Continuing with the preceding example, assume that the current band being processed from MDCT coefficient set AAC5 includes the MDCT coefficients $m_1$ through $m_4$ corresponding to the mantissa values $M_1$ through $M_4$. discussed in the preceding paragraph. The embedding unit 440 would therefore obtain the scale factor $S_k=160$ at block 830. The embedding unit 440 would further determine that the "exp" and "frac" part for the scale factor $S_k=160$ are $x_k = \lfloor S_k/R \rfloor = \lfloor 160/4 \rfloor = 40$ and $c_k = S_k\%\ R = 160\%4 = 0$, respectively.

Next, control proceeds to block 840 at which the embedding unit 440 modifies the "exp" and "frac" parts of the scale factor $S_k$ obtained at block 830 to allow watermark embedding. To embed a substantially imperceptible watermark in the AAC audio data stream 240, any changes in the MDCT coefficients arising from the watermark are likely to be very small. Due to quantization, if the original scale factor $S_k$ from the MDCT coefficient band being processed is used to attempt to embed the watermark, the watermark will not be detectable unless it causes a change in the MDCT coefficients equal to at least the original step size corresponding to the scale factor. In the preceding example, this means that the watermark signal would need to cause a change greater than 32768 for its effect to be detectable in the watermarked MDCT coefficients. However, the original scale factor (and resulting step size) was chosen through analyzing psychoacoustic masking properties such that an increment of an MDCT coefficient by the step size would, in fact, be noticeable. Thus, to provide finer resolution for embedding an unnoticeable, or imperceptible, watermark, a first simple approach would be to reduce the scale factor $S_k$ by one "exp" part. In the preceding example, this would mean reducing the scale factor $S_k$ from 160 to 156, yielding an "exp" of 156/4=39. Indexing the "exp" lookup table with an index=39 returns a corresponding step size of 16384, which is one half the original step size for this AAC band. However, halving the step size will cause a doubling (approximately) of all the quantized mantissa values used to represent the watermarked coefficients. The number of bits required for the Huffman coding will increase accordingly, causing the overall bit rate to exceed the nominal value specified for the compressed audio data stream.

Instead of using the first simple approach described above to modify scale factors for embedding imperceptible watermarks, at block 840 the embedding unit 440 modifies the "exp" and "frac" parts of the scale factor $S_k$ to provide finer resolution for embedding the watermark while limiting the increase in the bit rate for the watermarked compressed audio data stream. In particular, at block 840 the embedding unit 440 will modify the "exp" and/or "frac" parts of the scale factor $S_k$ obtained at block 830 to decrease the scale factor by a unit of resolution. Continuing with the preceding example, the scale factor obtained at block 830 was $S_k=160$. This corresponded to an "exp" part=40 and a "frac" part=0. At block 840, the embedding unit 440 will decrease the scale factor by 1 (a unit of resolution) to yield $S_k=160-1=159$. The "exp" and "frac" parts for the scale factor $S_k=159$ are $x_k = \lfloor S_k/R \rfloor = \lfloor 159/4 \rfloor = 39$ and $c_k = S_k\%\ R = 159\%4 = 3$, respectively. An "exp" part equal to 39 returns a corresponding step size of 16384 from the "exp" lookup table as discussed above. The "frac" part equal to 3 returns a multiplier of, for example, 1.6799 from the "frac" lookup table. The resulting actual step size corresponding to the modified scale factor $S_k$=159 is, thus, 1.6799×16384=27525. With reference to the preceding example, if the four adjacent uncompressed MDCT coefficients formed by processing the uncompressed digital data stream 300 with an MDCT transform were quantized with the modified scale factor $S_k$=159, the resulting quantized integer mantissas would be:

$M_1$=8, $M_2$=10, $M_3$=56, and $M_4$=111.

Next, control proceeds to block 850 at which the embedding unit 440 uses the modified scale factor determined at block 840 to quantize the temporary watermarked MDCT coefficients corresponding to the AAC band of MDCT coefficients being processed. Continuing with the preceding example of watermarking a band of MDCT coefficients $m_k$ from the AAC frame AAC5, at block 850 the embedding unit 440 uses the modified scale factor to quantize the corresponding temporary watermarked coefficients $xm_k$ from the temporary watermarked AAC frame AAC5X obtained at block 820. Control then proceeds to block 860 at which the embedding unit 440 replaces the mantissas and scale factors of the original MDCT coefficients in the band being processed with the quantized watermarked mantissas and modified scale factor determined at block 840 and 850. Continuing with the preceding example of watermarking a band of MDCT coefficients $m_k$ from the AAC frame AAC5, at block 860 the embedding unit 440 replaces the MDCT coefficients $m_k$ with the modified scale factor and the correspondingly quantized mantissas of the temporary watermarked coefficients $xm_k$ from the temporary watermarked AAC frame AAC5X to form the resulting watermarked MDCT coefficients ($wm_k$) to include in the watermarked AAC frame AAC5W.

Next, control proceeds to block 870 at which the embedding unit 440 determines whether all bands in the AAC frame 520 being processed have been watermarked. If all the bands in the current AAC frame have not been processed (block 870), control returns to block 820 and blocks subsequent thereto to watermark the next band in the AAC frame. If, however, all the bands have been processed (block 870), the example process 760 then ends. By using a modified scale factor that corresponds to reducing the original scale factor by a unit of resolution, the example process 760 provides finer quantization resolution to allow embedding of an imperceptible watermark in a compressed audio data stream. Additionally, because the modified scale factor differs from the original scale factor by only one unit of resolution, the resulting quantized watermarked MDCT mantissas will have similar magnitudes as compared to the original MDCT mantissas prior to watermarking. As a result, the same Huffman codebook will often suffice for encoding the watermarked MDCT mantissas, thereby preserving the bit rate of the compressed audio data stream in most instances. Furthermore, although the watermark will still be quantized using a relatively large step size, the redundancy of the watermark will allow it to be recovered even in the presence of significant quantization error.

Figure 9:
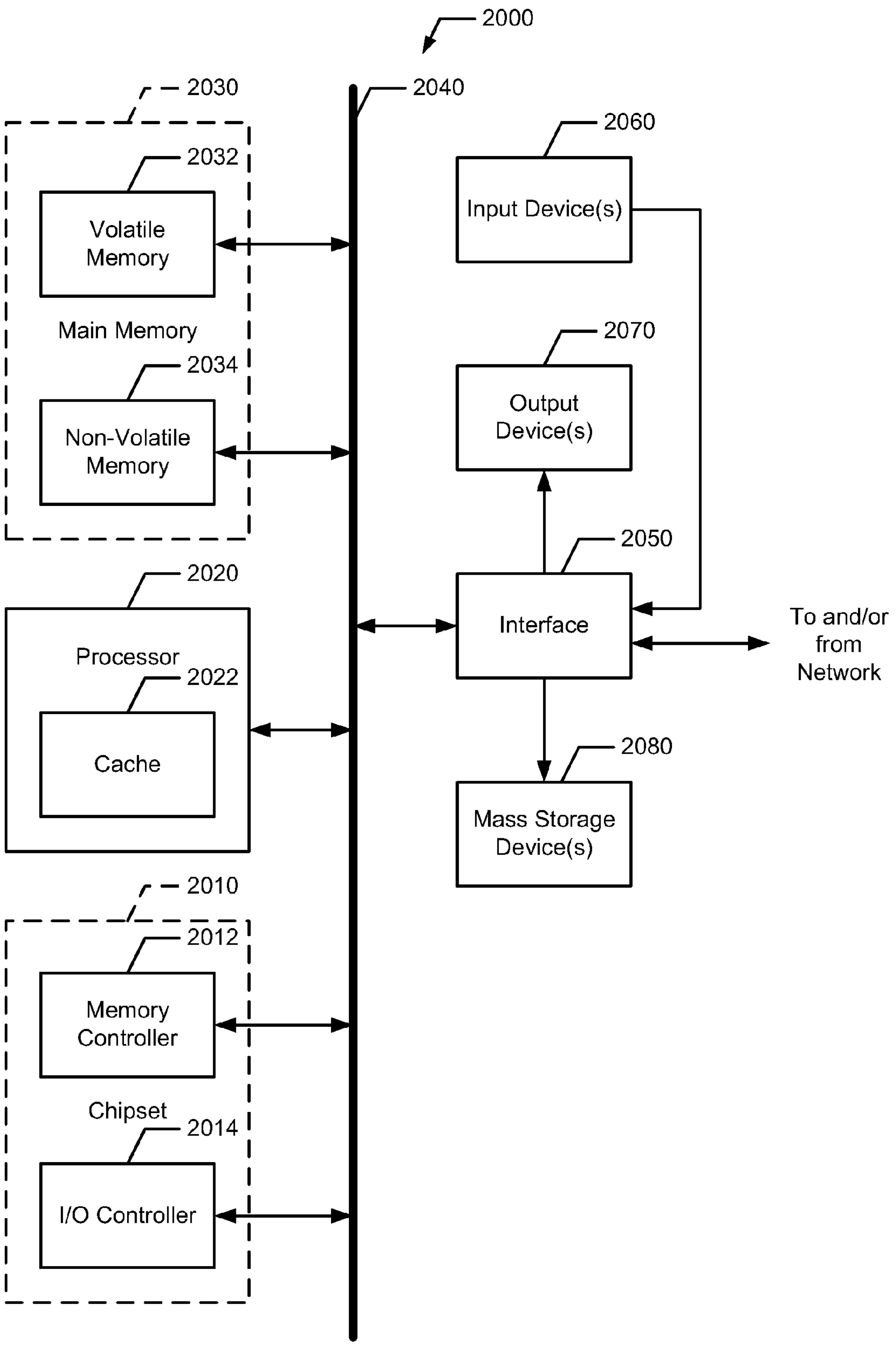
FIG. 9 is a block diagram representation of an example processor system that may be used to implement the example watermark embedding system of FIG. 2 and/or execute machine readable instructions to perform the example procedures of FIGS. 6-7 and/or 8.

FIG. 9 is a block diagram of an example processor system 2000 that may used to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 9 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 may be implemented using one or more processors. In the alternative, other processing technology may be used to implement the processor 2020. The example processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by media presentation devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some or all of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Methods and apparatus for modifying the quantized MDCT coefficients in a compressed AAC audio data stream are disclosed. The critical audio-dependent parameters evaluated during the original compression process are retained and, therefore, the impact on audio quality is minimal. The modified MDCT coefficients may be used to embed an imperceptible watermark into the audio stream. The watermark may be used for a host of applications including, for example, audience measurement, transaction tracking, digital rights management, etc. The methods and apparatus described herein eliminate the need for a full decompression of the stream and a subsequent recompression following the embedding of the watermark.

The methods and apparatus disclosed herein are particularly well suited for use with data streams implemented in accordance with the MPEG-AAC standard. However, the methods and apparatus disclosed herein may be applied to other digital audio coding techniques.

In addition, while this disclosure is made with respect to example television systems, it should be understood that the disclosed system is readily applicable to many other media systems. Accordingly, while this disclosure describes example systems and processes, the disclosed examples are not the only way to implement such systems.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although this disclosure describes example systems including, among other components, software executed on hardware, it should be noted that such systems are merely illustrative and should not be considered as limiting. In particular, it is contemplated that any or all of the disclosed hardware and software components could be embodied exclusively in dedicated hardware, exclusively in firmware, exclusively in software or in some combination of hardware, firmware, and/or software.

What is claimed is:

1. A method to embed a watermark in a compressed data stream, the method comprising:

obtaining a set of transform coefficients from the compressed data stream, the set of transform coefficients comprising a set of mantissas and a set of scale factors; and modifying, with a processor, a first one of the mantissas and a first one of the scale factors corresponding to a first transform coefficient from the set of transform coefficients based on a second mantissa and a second scale factor associated with a temporary watermarked transform coefficient to embed the watermark in the compressed data stream without uncompressing the compressed data stream.

2. A method as defined in claim 1 wherein modifying the first one of the mantissas and the first one of the scale factors comprises:

reducing the first one of the scale factors by a unit of resolution to determine the second scale factor; and quantizing the temporary watermarked transform coefficient based on the second scale factor to determine the second mantissa.

3. A method as defined in claim 1 wherein the set of scale factors comprises a set of exponents and a set of fractional multipliers, and further comprising modifying at least one of a first one of the exponents or a first one of the fractional multipliers corresponding to the first one of the scale factors to modify the first one of the scale factors.

4. A method as defined in claim 3 wherein modifying the first one of the scale factors comprises modifying the first one of the exponents and the first one of the fractional multipliers.

5. A method as defined in claim 1 wherein modifying the first one of the mantissas and the first one of the scale factors comprises:

determining the second scale factor to be the first one of the scale factors reduced by a unit of resolution;

quantizing the temporary transform coefficient based on the second scale factor;

encoding the quantized temporary transform coefficient based on a same codebook used to encode the first one of the mantissas to determine the second mantissa; and replacing the first one of the mantissas and the first one of the scale factors with the second mantissa and the second scale factor.

6. A method as defined in claim 1 wherein the compressed data stream comprises a compressed audio data stream and the set of transform coefficients comprises a set of modified discrete cosine transform coefficient.

7. A method as defined in claim 1 wherein the watermark corresponds to a frequency change in audio content carried by the compressed data stream, and the watermark is recoverable from a presentation of the audio content without access to the compressed data stream.

8. A machine readable storage disk or a machine readable storage device comprising circuitry, the machine readable storage disk or storage device comprising machine readable instructions which, when executed, cause a machine to at least:

obtain a set of transform coefficients from a compressed data stream, the set of transform coefficients comprising a set of mantissas and a set of scale factors; and modify a first one of the mantissas and a first one of the scale factors corresponding to a first transform coefficient from the set of transform coefficients based on a second mantissa and a second scale factor associated with a temporary watermarked transform coefficient to embed a watermark in the compressed data stream without uncompressing the compressed data stream.

9. A machine readable storage disk or storage device as defined in claim 8 wherein to modify the first one of the mantissas and the first one of the scale factors, the machine readable instructions, when executed, further cause the machine to:

reduce the first one of the scale factors by a unit of resolution to determine the second scale factor; and quantize the temporary watermarked transform coefficient based on the second scale factor to determine the second mantissa.

10. A machine readable storage disk or storage device as defined in claim 8 wherein the set of scale factors comprises a set of exponents and a set of fractional multipliers, and the machine readable instructions, when executed, further cause the machine to modify at least one of a first one of the exponents or a first one of the fractional multipliers corresponding to the first one of the scale factors to modify the first one of the scale factors.

11. A machine readable storage disk or storage device as defined in claim 10 wherein to modify the first one of the scale factors, the machine readable instructions, when executed, further cause the machine to modify the first one of the exponents and the first one of the fractional multipliers.

12. A machine readable storage disk or storage device as defined in claim 8 wherein to modify the first one of the mantissas and the first one of the scale factors, the machine readable instructions, when executed, further cause the machine to:

determine the second scale factor to be the first one of the scale factors reduced by a unit of resolution;

quantize the temporary transform coefficient based on the second scale factor;

encode the quantized temporary transform coefficient based on a same codebook used to encode the first one of the mantissas to determine the second mantissa; and replace the first one of the mantissas and the first one of the scale factors with the second mantissa and the second scale factor.

13. A machine readable storage disk or storage device as defined in claim 8 wherein the compressed data stream comprises a compressed audio data stream and the set of transform coefficients comprises a set of modified discrete cosine transform coefficient.

14. A machine readable storage disk or storage device as defined in claim 8 wherein the watermark corresponds to a frequency change in audio content carried by the compressed data stream, and the watermark is recoverable from a presentation of the audio content without access to the compressed data stream.

15. An apparatus to embed a watermark in a compressed data stream, the apparatus comprising:

an unpacking unit to obtain a set of transform coefficients from the compressed data stream, the set of transform coefficients comprising a set of mantissas and a set of scale factors; and an embedding unit to modify a first one of the mantissas and a first one of the scale factors corresponding to a first transform coefficient from the set of transform coefficients based on a second mantissa and a second scale factor associated with a temporary watermarked transform coefficient to embed a watermark in the compressed data stream without uncompressing the compressed data stream, at least one of the unpacking unit or the embedding unit comprising hardware.

16. An apparatus as defined in claim 15 wherein to modify the first one of the mantissas and the first one of the scale factors, the embedding unit is to:

reduce the first one of the scale factors by a unit of resolution to determine the second scale factor; and quantize the temporary watermarked transform coefficient based on the second scale factor to determine the second mantissa.

17. An apparatus as defined in claim 15 wherein the set of scale factors comprises a set of exponents and a set of fractional multipliers, and the embedding unit is to modify at least one of a first one of the exponents or a first one of the fractional multipliers corresponding to the first one of the scale factors to modify the first one of the scale factors.

18. An apparatus as defined in claim 17 wherein to modify the first one of the scale factors, the embedding unit is to modify the first one of the exponents and the first one of the fractional multipliers.

19. An apparatus as defined in claim 15 wherein to modify the first one of the mantissas and the first one of the scale factors, the embedding unit is to:

determine the second scale factor to be the first one of the scale factors reduced by a unit of resolution;

quantize the temporary transform coefficient based on the second scale factor;

encode the quantized temporary transform coefficient based on a same codebook used to encode the first one of the mantissas to determine the second mantissa; and replace the first one of the mantissas and the first one of the scale factors with the second mantissa and the second scale factor.

20. An apparatus as defined in claim 15 wherein the compressed data stream comprises a compressed audio data stream, the set of transform coefficients comprises a set of modified discrete cosine transform coefficient, the watermark corresponds to a frequency change in audio content carried by the compressed audio data stream, and the watermark is recoverable from a presentation of the audio content without access to the compressed data stream.

* * * * *